United States Patent [19]
Allen et al.

[11] Patent Number: 5,699,479
[45] Date of Patent: Dec. 16, 1997

[54] TONALITY FOR PERCEPTUAL AUDIO COMPRESSION BASED ON LOUDNESS UNCERTAINTY

[75] Inventors: Jonathan Brandon Allen, Mountainside; Sean Matthew Dorward, Somerville; James David Johnston, Warren; Mark R. Sydorenko, Plainfield, all of N.J.

[73] Assignee: Lucent Technologies Inc., Murray Hill, N.J.

[21] Appl. No.: 384,097

[22] Filed: Feb. 6, 1995

[51] Int. Cl.$^6$ ........................................... G10L 9/18
[52] U.S. Cl. ........................ 395/2.14; 345/2.39; 375/241
[58] Field of Search ........................ 395/2.1, 2.12, 395/2.14, 2.15, 2.35, 2.36, 2.39, 2.38; 370/118, 477; 375/240, 241

[56] References Cited

U.S. PATENT DOCUMENTS

| | | | |
|---|---|---|---|
| 5,040,217 | 8/1991 | Brandenburg et al. | 381/47 |
| 5,185,800 | 2/1993 | Mahieux | 381/29 |
| 5,227,788 | 7/1993 | Johnston et al. | 341/63 |
| 5,264,846 | 11/1993 | Oikawa | 341/76 |
| 5,285,498 | 2/1994 | Johnston et al. | 381/2 |
| 5,341,457 | 8/1994 | Hall et al. | 395/2.35 |
| 5,481,614 | 1/1996 | Johnston | 381/2 |
| 5,537,510 | 7/1996 | Kim | 395/2.38 |

FOREIGN PATENT DOCUMENTS

| | | | |
|---|---|---|---|
| 9 424 016 | 10/1990 | European Pat. Off. | H04B 1/66 |
| 0 446 037 | 3/1991 | European Pat. Off. | H04B 1/66 |

OTHER PUBLICATIONS

Application Serial No. 07/844819 (Ferreira 1–15), filed 3/2/92.

Application Serial No. 07/844811 (Johnston 16), filed 3/2/92.

Application Serial No. 08/384049 (Allen 12–3–1), filed 2/6/95.

Allen, J.B., "Cochlear Micromechanics —A Physical Model of Transduction," *J. Acoust. Soc. Am.*, vol. 68, pp.1660–1670 (1980).

Allen et al., *J. Acoust. Soc. Am.*, vol 95, pp. 3006 (1994).

Buus, S., "Level Discrimination of Frozen and Random Noise,"*J. Acoust. Soc. Am.*, vol. 87, No. 6, pp. 2643–2654, Jun. 1990.

Edler, "Coding of Audio Signals With Overlapping Block Transform and Adaptive Window Functions, " *Frequenz*, vol. 43, pp. 252–256(1989).

Hellman, W.S. et al., "Intensity Discrimination as the Driving Force for Loudness," *J. Acoust. Soc. Am.*, vol. 87, No. 3, pp. 1255–1265, Mar. 1990.

Johnston et al., "Wideband Coding–Perceptual Considerations for Speech and Music," *Advances in Speech Signal Processing*, Furui et al., ed. (1992).

Johnston et al., "Sum–Difference Stereo Transform Coding," *Proc. of IEEE*, ICASSP, San Francisco, II–569–572 (1992).

Schroeder, M.R. et al., "Optimizing Digital Speech Coders by Exploiting Masking Properties of the Human Ear," *J. Acoustic. Soc. Am.*, vol. 66, No. 6, pp. 1647–1652, Dec. 1979.

Teich, M.C. et al. "Pulse–number Distribution for the Neural Spike Train in the Cat's Auditory Nerve," *J. Acoust. Soc. Am.*,vol. 77, PP. 1110–1128, 1985.

*Primary Examiner*—Russell W. Blum

[57] ABSTRACT

A new technique for the determination of the masking effect of an audio signal is employed to provide transparent compression of an audio signal at greatly reduced bit rates. The new technique employs the results of recent research into the psycho-physics of noise masking in the human auditory system. This research suggests that noise masking is a function of the uncertainty in loudness as perceived by the brain. Measures of loudness uncertainty are employed to form noise masking thresholds for use in the compression of audio signals. These measures are employed in an illustrative subband, analysis-by-synthesis framework. In accordance with the illustrative embodiment, provisional encodings of the audio signal are performed to determine the encoding which achieves a loudness differential, between the original and coded audio signal, which is less than (but not too far below) the loudness uncertainty.

19 Claims, 14 Drawing Sheets

FIG. 1

TABLE 1

| SOURCES OF DECISION VARIABLE UNCERTAINTY |
|---|
| INTERNAL:<br>  NEURAL ENCODING |
| EXTERNAL (DUE TO RANDOM SIGNALS):<br>  (1) INTENSITY:<br>    (a) GAUSSIAN NOISE INTENSITY VARIABILITY<br>    (b) STIMULUS ON/OFF RAMPS<br>    (c) CORRELATION BETWEEN $p_T$ AND $m_T$<br>  (2) WAVEFORM |

FIG. 2

TABLE 2

| EXPERIMENT I | TRIAL | | FIGURE |
| --- | --- | --- | --- |
| | INTERVAL A: $m(t) =$ | INTERVAL B: $m(t) + p(t) =$ | |
| MASKED AUDIOGRAMS: | | | |
| FIXED PHASE TONE MASKER | $s_j(t)$ | $s_j(t) + \alpha S_j(t, f)$ | 4 |
| RANDOM NOISE MASKER | $n_j(t)$ | $n_j(t) + \alpha S_j(t, f)$ | 4 & 5 |
| RANDOM PHASE TONE MASKER | $s_j(t)$ | $s_j(t) + \alpha S_j(t, f)$ | 5 |

| EXPERIMENT II | TRIAL | | FIGURE |
| --- | --- | --- | --- |
| | INTERVAL A: $m(t) =$ | INTERVAL B: $m(t) + p(t) =$ | |
| JND: | | | |
| TONE | $s_j(t)$ | $(1+\alpha) s_j(t)$ | 6, 7, & 9 |
| RANDOM NOISE | $n_j(t)$ | $(1+\alpha) n_j(t)$ | 6, 7, & 9 |
| TONE MASKED THRESHOLD: | | | |
| (1) RANDOM $\Delta I$: | | | |
| TONE MASKER | $s_j(t)$ | $s_j(t) + \alpha S_j(t)$ | 6 & 9 |
| RANDOM NOISE MASKER | $n_j(t)$ | $n_j(t) + \alpha S_j(t)$ | 6 & 9 |
| (2) CONTROLLED $\Delta I$: | | | |
| TONE MASKER | $s_j(t)$ | $s_j(t) + \alpha S_j(t)$ | 6, 7, & 9 |
| RANDOM NOISE MASKER | $n_j^*(t)$ | $n_j^*(t) + \alpha S_j(t)$ | 6, 7, & 9 |

| EXPERIMENT III | TRIAL | | | FIG. |
| --- | --- | --- | --- | --- |
| | INTERVAL A: $m(t) =$ | INTERVAL B: $m(t) =$ | INTERVAL C: $m(t) + p(t) =$ | |
| JND: | | | | |
| TONE | $s_j(t)$ | $s_j(t)$ | $(1+\alpha) s_j(t)$ | 9 |
| RANDOM NOISE | $n_j(t)$ | $n_j(t)$ | $(1+\alpha) n_k(t)$ | 9 |
| TONE MASKED THRESHOLD: | | | | |
| (1) RANDOM $\Delta I$: | | | | |
| TONE MASKER | $s_j(t)$ | $s_j(t)$ | $s_j(t) + \alpha S_j(t)$ | 9 |
| RANDOM NOISE MASKER | $n_j(t)$ | $n_j(t)$ | $n_k(t) + \alpha S_j(t)$ | 9 |
| (2) CONTROLLED $\Delta I$: | | | | |
| TONE MASKER | $s_j(t)$ | $s_j(t)$ | $s_j(t) + \alpha S_j(t)$ | 9 |
| RANDOM NOISE MASKER | $n_j^*(t)$ | $n_j^*(t)$ | $n_k^*(t) + \alpha S_j(t)$ | 9 |

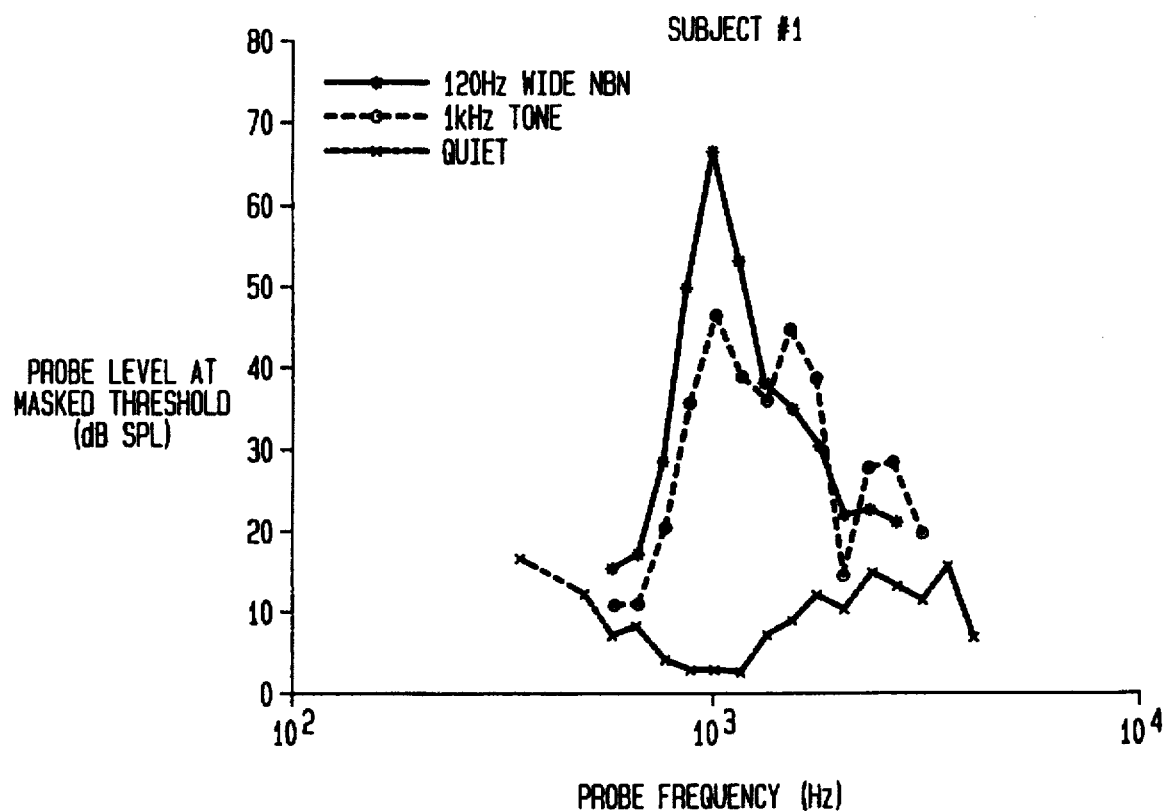
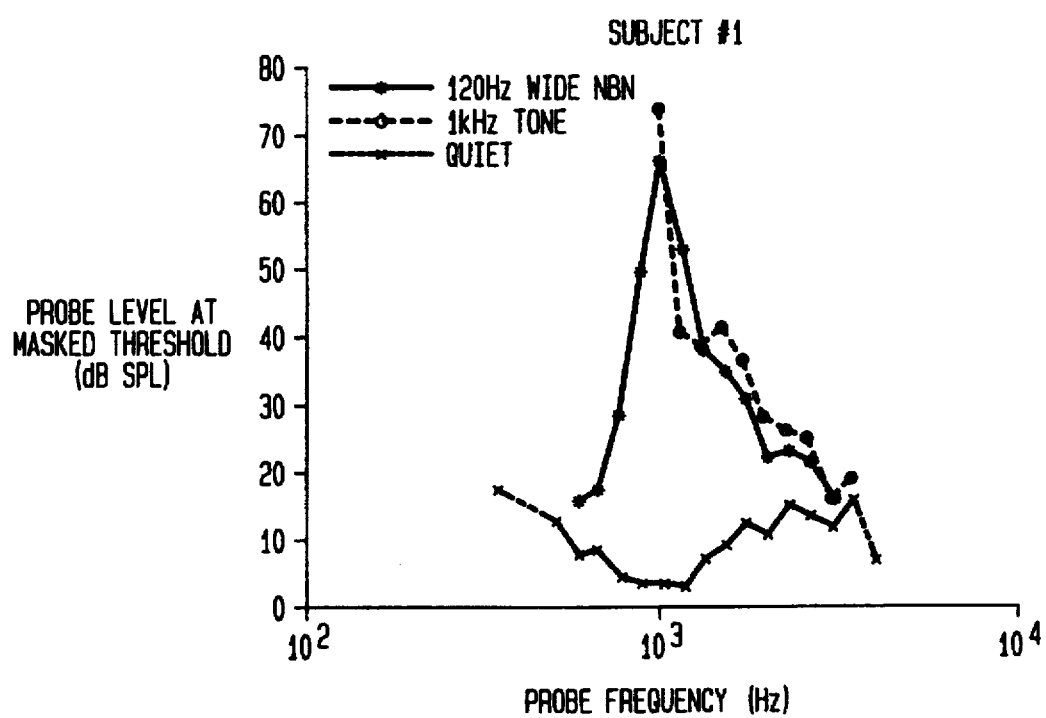

TONALITY FOR PERCEPTUAL AUDIO COMPRESSION BASED ON LOUDNESS UNCERTAINTY

FIELD OF THE INVENTION

The present invention relates generally to audio signal compression systems and more specifically to such systems which employ models of human perception in achieving high levels of signal compression.

BACKGROUND OF THE INVENTION

Perceptual coding of audio signals involves the concept of "perceptual masking." Perceptual masking refers to a psycho-acoustic effect where a listener cannot hear an otherwise audible sound because that sound is presented to the listener in the presence of another sound (referred to as the "masking signal").

This psycho-acoustic effect has been employed to advantage in several audio compression systems which treat the audio signal—the signal to be compressed—as the masking signal and coding (or quantizer) noise as the signal to be masked. These systems seek to quantize the audio signal with a stepsize which is as large as possible without introducing audible quantization noise in the audio signal. Naturally, the level of quantization noise which may be introduced without audible effect will be a function of how well a particular audio signal—the masker—serves to supply a masking effect. The greater the masking ability of the audio signal, the coarser the quantization may be without introducing audible noise. The coarser the quantization, the lower the bit-rate of the compressed signal.

In the past, the ability of an audio signal to mask noise has been linked to how tone-like (or, conversely, noise-like) the audio signal is. A given audio signal may fall anywhere along a continuum from "pure tone" to "pure noise." However, audio signals which are more noise-like have been empirically determined to be better at masking quantization noise than audio signals which are more tone-like in comparison. Accordingly, measures of tone-likeness —referred to as "tonality"—and noise-likeness—referred to as "chaos"—have been employed by audio compression systems as a basis of setting of quantizer step size. Examples of such systems include those described in U.S. Pat. No. 5,040,217, by K. Brandenberg and J. D. Johnston; U.S. Pat. No. 5,341,457, by J. L. Hall and J. D. Johnston; and U.S. patent applications Ser. Nos. 07/844,804 now U.S. Pat. No. 5,285,498; 07/844,819, now abandoned; 07/844,811 now abandoned (all filed Mar. 2, 1992 and U.S. Pat. No. 5,227,788 (all of which are incorporated by reference as if fully set forth herein). As explained in these references, tonality is used to compute a perceptual threshold which in turn is used to compute stepsize. Through such measures as tonality (and chaos), these systems have been able to reduce bit-rate without introducing substantial, if any, perceivable degradation of (quantization noise in) the audio signal.

In the past, such systems have computed the tonality measure with use of a tone prediction scheme. Tonality of an audio signal at a given point in time was computed based on how well the audio signal matched a predicted audio signal value at that time, the prediction being a function of past audio signal values. The predicted audio signal value is determined based on an assumption that the audio signal is a pure tone. If the predicted signal value matched the actual value of the signal, the assumption that the actual signal could be well represented by a tone model would be validated and a large value of tonality (e.g., one, on a normalized scale) would result. If, on the other hand, the predicted signal value did not match the actual signal value very well—a result which undercuts the original assumption that the signal is a pure tone—a comparatively small value of tonality would result. As such, the signal would be assigned a tonality metric value of less than one, with the exact value being dependent on the degree to which the actual signal value differed from the predicted value. (Chaos, on a normalized scale, is a measure which equals one minus the value of tonality).

Although the concept of tonality (and chaos) has been used to advantage in determining quantizer stepsize, the concept is based on observed effects on masking ability of different types of signals, not an understanding of how such effects are caused in the human auditory system as a result of exposure to such signals.

SUMMARY OF THE INVENTION

The present invention provides a new technique for determining the masking effect of an audio signal. The invention employs the results of recent research into the psycho-physics of noise masking in the human auditory system (see the Detailed Description below). This research suggests that noise masking is a function of the uncertainty in loudness as perceived by the brain. In accordance with an illustrative embodiment, an approximation of this uncertainty in loudness is provided by a measure of signal amplitude variation over time. The embodiment employs a measure of signal amplitude variation (e.g., signal energy variation) as a basis for determining how tone-like an audio signal is. The degree to which a signal is tone-like is used to determine perceptual thresholds for quantizing the audio signal.

BRIEF DESCRIPTION OF THE DRAWINGS

FIG. 1 is a table enumerating sources of decision variable uncertainties in detecting the presence of a tone in noise.

FIG. 2 is a table summarizing results of three experiments conducted in a study.

FIG. 4 illustrates masked audiograms using a variable frequency pure tone probe for a first subject in a first experiment.

FIG. 5 illustrates second masked audiograms for the first subject in the first experiment.

DETAILED DESCRIPTION

Figure 3A:
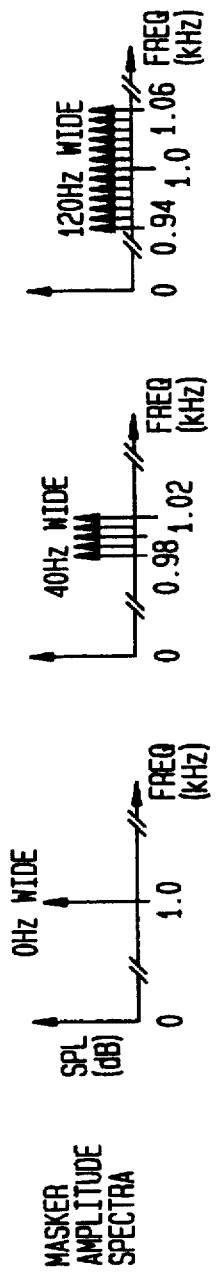
FIG. 3A illustrates amplitude spectra of masking stimuli (or maskers) used in the experiments.

Noise Masking in the Human Auditory System

The present invention is directed to a technique for determining the masking effect of an audio signal. In order to more appreciate the invention, the following sections 1 through 8 discuss a study on the relationship between masking, the just noticeable difference (JND) in intensity and loudness, which suggests that noise masking in the human auditory system is a function of the uncertainty in loudness as perceived by a human (note that numerals in brackets throughout the discussion refer to the corresponding references in section 8):

Relationship between Masking, JND in Intensity and Loudness

1 INTRODUCTION

1.1 Need for a masking model

The problem of determining the masked threshold for an arbitrary masker is a basic problem in psychophysics which has many important engineering applications. First, the masked threshold is needed in speech and music coders to determine the bit allocations [35, 22, 39]. Second, the masked threshold is important in calculating the loudness of a signal [13, 37, 45]. Third, masking is important in defining the critical bandwidth. Fourth, the masking is required when calculating the articulation index when determining speech intelligibility [11].

1.2 Central issue: Tone versus noise maskers

Presently there are no well developed methods for accurately predicting the masked threshold for arbitrary maskers. For example, there are no models that can account for the large difference in the masking ability of tones and narrow bands of noise of equal intensity. Measurements of the masked threshold for a tone probe whose frequency is centered on the masker frequency show up to a 23 dB increase in threshold if the masker is a narrow band of noise versus an equal intensity tone [7, 8]. This difference in masked threshold can be seen in FIG. 4 of Experiment I where we measure masked audiograms using a 70 dB SPL tone masker and a 70 dB SPL, 120Hz wide, random noise masher centered at 1 kHz. A similar difference in masking efficacy between tones and equal intensity narrow bands of noise is observed if the probe is a wide band noise [44] or a click [20]. Thus an understanding of the effect of masker bandwidth on masked threshold is a central issue in the development of a general model of masking.

The difference in the masking ability of tones versus equal intensity narrow band noises is particularly confounding for a variety of published methods that compute masked threshold based on the energy spectrum of the masking stimulus. For example, most techniques for calculating the loudness of an arbitrary sound rely on the assumption that loudness is directly related to the pattern of excitation in the auditory nerve [12, 13, 37, 45]. All of these methods infer the profile of neural activity produced by a sound from the psychophysical masked audiogram when that sound is used as the masker. The area under the masked audiogram is transformed into a representation of the neural activity [13] or "specific loudness" [45] which, when integrated across the spectrum, yields an estimate of the total loudness of the sound.

Fletcher and Munson, who were the first to publish a method for loudness calculation, noted an inconsistency when using masked audiograms to infer neural excitation. Although tones and sub-critical bandwidth (SCBW) noises of equal intensity have nearly the same loudness [9], the area under their masked audiograms are quite different (see FIG. 4). The difference in the masking properties of signals with discrete spectra (e.g. multi-tone complexes) [12] versus signals with continuous spectra [13] (e.g. noise or speech) prevented Fletcher from developing a unified model of the relationship between masking and loudness. Zwicker's method for calculating loudness, although based on the same concepts, ignores the difference in the masking properties of tones and noises by treating all signals as noise-like [45].

Speech and music coders which exploit the masking properties of the input sound to hide quantization noise are also hampered by the difference in masking efficacy of tones versus noises when computing the masked threshold [35, 22]. Developers of these coders struggle with the problem of defining the two classes of signals, tonelike versus noise-like, as well as identifying the two classes in sub-bands of the input signal. If a unifying model that relates the masking properties of noise signals to tone signals existed, the issues currently faced by these coders when categorizing signals might be eliminated.

1.3 Statement of the problem

Our ultimate goal is to develop a model of masking that predicts the masked threshold for arbitrary signals. In this discussion we examine cases in which (1) the masker ranges in bandwidth from zero (i.e. pure tone masker) up to the critical bandwidth (i.e. SCBW noise maskers), and (2) the probe is a pure tone or a noise of the same bandwidth as the masker.

$$\text{Masking stimulus} - m_T = m(t) \ t \in [0, T]. \tag{1}$$

$$\text{Probe stimulus} = p_T = p(t) \ t \in [0, T]. \tag{2}$$

All signals are centered at 1 kHz.

Our results suggest that the difference in masked threshold between tone and noise maskers is related to the intensity change that results when the probe is added to the masker. If $I[m_T]$ is the intensity of the masker and $I[m_T+p_T]$ is the intensity of the masker plus probe, then the intensity change $\Delta I$ is given by $$\Delta I = I[m_T + p_T] - I[m_T] \tag{3}$$

$$= \frac{1}{T} \int_0^T (m(t) + p(t))^2 dt - \frac{1}{T} \int_0^T m(t)^2 dt \quad (4)$$

$$= I[p_T] + \frac{1}{T} \int_0^T m(t)p(t) dt \quad (5)$$

The right-most term in Eq. 5 represents the correlation between the masker and probe signals. Thus the intensity increment resulting from adding the probe to the masker depends not only on the intensity of probe, $I[p_t]$, but on the correlation between $m_T$ and $p_T$, as well. The relative intensity change $\Delta I/I$, also known as the Weber fraction in $JND_I$ tasks, is given by $$\frac{\Delta I}{I} = \frac{I[m_T + p_T] - I[m_T]}{I[m_T]} \quad (6)$$

$$= \frac{\Delta I}{I[m_T]} \cdot \quad (7)$$

If the masker and probe are frozen (i.e. deterministic) signals, the intensity increment will be greatest for positively correlated masker and probe signals and least for negatively correlated signals. If the masker or probe are random signals, as is the case for tones masked by random noise, the correlation between masker and probe will vary amongst trials. Therefore, the intensity increment is random when a tone is added to random noise as opposed to a constant intensity increment when a tone is added to another tone or frozen noise. Frequently, and incorrectly, it has been assumed that the masker and probe signal are uncorrelated when calculating the intensity increment. Before describing the experiments we will review the issues relevant to making the connection between masking and intensity increments.

1.4 Case of masker and probe of same bandwidth

We begin with the case where the probe Signal is a scaled copy of the masker signal, namely $$p(t) = \alpha m(t), \quad (8)$$

where $\alpha$ is a scale factor. In this case, where the signal is masking itself, the observer's task becomes one of detecting a just noticeable difference in intensity $(JND_I)$ when the probe is added to the masker. The $\Delta I$ is related to $\alpha$ as $$\Delta I = (2\alpha + \alpha^2)I[m_T] \approx 2\alpha I[m_T] \text{ (for small } \alpha). \quad (9)$$

1.4.1 $JND_I$ examined using detection theory

The detectability of intensity increments has been examined using detection theory [14, 6]. The basic idea behind signal detection theory is that the observer bases their judgments on a decision variable which is a random function of the stimulus. For example, the decision variable must be a function of the stimulus intensity in a $JND_I$ task. The uncertainty associated with the subjective ranking of a stimulus is reflected in the distribution of the decision variable. Detection theory shows that the variance of the decision variable limits the subject's ability to distinguish between stimuli that differ only in their intensity [14, 15, 6, 26, 32, 23, 19]

1.4.2 $\Delta I$ as a measure of decision variable variance

Masking and $JND_I$ are typically measured in a two-interval forced choice (2-IFC) paradigm, where one interval contains the masker $m_T$ and the other interval contains the masker plus probe $m_T + p_T$. The order of presentation of the two intervals within a trial is randomized and the subject is asked to identify which interval contains the probe. The probe level is varied until the level corresponding to a given detection criterion (e.g. 76% correct) is located. Several auditory detection models assume that the decision variable in a $JND_I$ tasks has a Gaussian distribution [14, 15, 6, 32] with a mean value that is linearly related to the intensity (I) of the signal. For example, in a 2-IFC $JND_I$ task, the interval corresponding to the standard signal will have one distribution mean whereas the interval corresponding to the higher intensity signal will have a slightly greater mean. If the distributions in the two intervals have identical standard deviations, the subject will correctly identify the more intense signal 76% of the time when the distance between the means is equal to the standard deviation of the distribution (i.e. d'=1). Since the mean value of the decision variable is monotonically related to the intensity of the signal, the difference in intensity between the two intervals (i.e. $\Delta I$ as defined in Eqs. 3–5 and Eq. 9) at 76% correct performance is a direct measure of the standard deviation of the decision variable's distribution.

1.4.3 Internal versus external sources of uncertainty

The variance of the decision variable in JND tasks may be decomposed into an internal and external source of uncertainty [6, 26, 32, 4]. The internal uncertainty is an inherent characteristic of the auditory system (e.g. uncertainly contributed by the stochastic neural representation) and represents a fundamental limit on the best performance possible (e.g. in a tone $JND_I$ task). External uncertainty is contributed by the signal. For example, the intensity of a finite duration sample of Gaussian noise varies randomly about some mean value thus providing an external source of signal level uncertainty. Buus demonstrated that the $JND_I$ for a sub-critical bandwidth (SCBW) Gaussian noise is reduced if the noise is frozen rather than random from interval to interval at sound levels greater than 60 dB SPL [4]. Buus interprets the $\Delta I/I$ for the frozen noise as a measure of the internal uncertainty (subjective uncertainty) and the $\Delta I/I$ for the random noise as a measure of the combined internal and external certainty (stimulus uncertainty). The $\Delta I/I$ of a tone was found to be the same as that of an equal intensity frozen SCBW noise, which is consistent with this interpretation [4].

1.4.4 Previous models of decision variable variance

Green derived an approximate solution for the intensity distribution of a band limited, time truncated Gaussian noise [14.]. Under the assumption that the value of the decision variable is linearly related to the intensity of the stimulus (the "energy model") and the implicit assumption that the internal uncertainty is dominated by the external signal intensity uncertainty, Green shows that such a detection model is qualitatively consistent with psychophysically measured performance. However, the quantitative predictions are consistently lower than observed human performance. The difference between the predicted and observed values is on the order of 5 dB [14].

De Boer attributed this failure to a lack of an internal source of uncertainty and reformulated Green's model by including an internal source whose variance was proportional to the stimulus intensity [6]. Although de Boer's results indicated an improvement in the qualitative fit of the revised model to psychophysical data, the range of values of the detectability parameter and of the constant of proportionality relating internal variance to stimulus intensity (which, in some cases, assumed negative values) indicated an overall failure of de Boer's model to quantitatively account for the data [6].

In this discussion, we present experimental results that show that these "energy models" fail to predict human performance because the auditory system is not an energy detector. Our results suggest that the non-linearities in the auditory system give rise to yet another source of uncertainty (waveform uncertainty) that is not present in an energy model. This additional source of decision variable uncertainty accounts for the failures of the energy model.

1.5 The relation between $JND_I$ and masked threshold

Earlier it was pointed out that when the masker and probe signals are identical, the masking task is equivalent to finding the $JND_I$ of the stimulus. Miller [27] was one of the first to point out clearly this "operational similarity" between masking and $JND_I$ experiments. Subsequent publications by other authors indicated the acceptance of his hypothesis that masking and JND in intensity are fundamentally related [16, 5, 2,017]. Despite the plausibility of such a connection between masking and intensity increments, however, there appears to be an absence of a general theory that quantitatively links these two phenomenon, thereby permitting the quantitative prediction of masking results from $JND_I$ data.

A relationship between masking and $JND_I$ can be established if it can be shown that the decision variable is a function of the same stimulus attribute(s) in these two tasks. It is clear that the decision variable in a $JND_I$ task must be a random function of only the stimulus intensity because this is the only attribute of the signal that is changed within a trial. However, the decision variable in a masking task could be a function of the shape of the stimulus waveform as well as the stimulus intensity since both of these attributes change when the probe is added to the masker. The question is, how much of an improvement in detection performance can we expect if the information contained in the details of the signal waveform is utilized in addition to the information in the signal intensity?

1.5.1 Waveform shape changes associated with adding tones to random SCBW noise provide no additional information We hypothesize that there are at least two perceptual cues available to the observer in a masking task in which the masker is a SCBW noise and the probe is a tone. One cue is the change in signal intensity (e.g. loudness cue) and the second cue is the change in signal waveform (e.g. tonality cue). Both cues are clearly perceptible for tone levels above masked threshold. However, we are interested in identifying the stimulus attribute(s) responsible for determining the absolute lowest threshold of perception. To resolve the perceptual cue issue we conducted two sets of experiments.

In Experiment II we conducted 2-IFC masking experiments in which the intensity cue was controlled and compared the measured masked thresholds to the $JND_I$ of the masking stimuli. According to Eq. 5, the intensity change $\Delta I$ resulting from adding the probe to the masker depends on the correlation between the probe and masker. Normally the correlation between a tone probe and a random noise masker is random, hence the resulting $\Delta I$ is random. However, we digitally generated our tone probe and random noise maskers so that the tone always added in phase to the noise masker to produce a constant rather than random $\Delta I$. Details about the stimuli are given in the Methods section. The results of Experiment II show that the tone probe level at masked threshold produces an intensity increment ($\Delta I$) that is equivalent to the $JND_I$ of the masking SCBW noise stimulus. This result establishes a fundamental relationship between masking and just noticeable differences in intensity.

Experiment III was designed to unambiguously identify intensity and not waveform as the stimulus attribute responsible for determining the absolute lowest masked threshold. In Experiment III we measured masked thresholds and $JND_I$ of the masking stimuli using a 3-IFC paradigm and compared the results to masked thresholds for the same stimuli in a 2-IFC paradigm. In the 3-IFC paradigm, subjects were instructed to "pick the interval that sounds different". The observed thresholds for tones masked by SCBW noise were identical in the 2-IFC and 3-IFC paradigms. The similarity of results in the two paradigms demonstrates that subjects utilized the absolute lowest threshold perceptual cue in the 2-IFC paradigm because the subjects could use either an intensity or waveform cue to detect the "different" interval containing the tone probe in the 3-IFC paradigm. Combining the results of Experiments II and III, we conclude that stimulus intensity alone can account for the absolute lowest threshold for detecting tones in noise.

Thus, we have identified one source of the increased threshold for signals masked by SCBW noise versus tones— the difference in $JND_I$ for the two maskers. Since the $JND_I$ for a random SCBW noise is greater than that for a tone, we would expect that the probe would have to be more intense to produce a detectable intensity change when masked by random SCBW noise versus a tone (or frozen SCBW noise).

A second and equally important source of the increased threshold is that adding a tone to random noise results in a random intensity increment as opposed to the constant intensity increment in $JND_I$ tasks.

1.5.2 Another source of external uncertainty: Masker-Probe correlation

Besides measuring thresholds for detecting tone probes added in phase to random noise maskers we also measure thresholds without controlling the correlation between probe and masker (i.e. a "normal" masked threshold experiment) in Experiments II and III. The results show that masked thresholds are greater when the correlation between probe and masker are uncontrolled. Thus, the random $\Delta I$ caused by adding a tone probe to the random noise masker with no phase control provides yet another source for decision variable uncertainty. This $\Delta I$ uncertainty contributes to elevate the threshold for probes masked by noise.

1.6 Purpose of the study

We hypothesize the threshold for any SCBW probe masked by any SCBW masker of equal or greater bandwidth, be it random or deterministic, can be predicted if the distribution of internal uncertainty (i.e. the tone $JND_I$) is known. Our goal is to develop a model that can accurately predict the masked threshold for a narrow band probe in the presence of an arbitrary SCBW masker. Such a model would, amongst other things, explain the approximately 20 dB difference in masking efficacy of tones versus noises. The endeavor is based on the hypothesis that the decision variable, when one is detecting the presence of a tone in noise, is solely a function of the stimulus intensity as in the $JND_I$ task. Therefore, the central issue we investigate is the relationship between the intensity increment at threshold for a tone masked by a SCBW masker and the $JND_I$ of the masker.

The detectability of intensity increments is governed by the statistical distribution of the decision variable. There are internal and several external sources that determine the distribution of the decision variable. Table 1 in FIG. 1 decomposes these sources of decision variable uncertainty. Previous "energy models" fail to quantitatively predict the increase in decision variable variance when the masker is a random noise versus a frozen stimulus. Although these energy models included external sources of uncertainty contributed by the chi-squared intensity distribution of band-limited, time-truncated Gaussian noise, we believe that the failures are due to the omission of an additional source of external uncertainty, the waveform uncertainty. Therefore, we designed our experiments to dissect out the external uncertainty contributed by the intensity variability of Gaussian noise, thus leaving only the waveform uncertainty and a small amount of intensity uncertainty due to the stimulus on/off ramps. To this end, our random noise stimuli are generated by summing sine waves of constant intensities but random phases. Such a noise stimulus has constant intensity (constant spectral level) but a random waveform from interval to interval. Thus, unlike a random Gaussian noise stimulus, whose intensity randomly varies from interval to interval, any uncertainty in the decision variable due to our constant spectrum level random noise can not be ascribed to intensity variability. Further, using such a noise stimulus permits control over the correlation between the probe and masker signals thus enabling us to study the contribution of masker-probe correlation uncertainty to the variance of the decision variable. Table 2 in FIG. 2 summarizes the experiments conducted.

In Table 2, n(t) is a 70 dB SPL constant spectral level random noise signal centered at 1 kHz, s(t) is a 70 dB 1 kHz sine, and S(t, f) is a sine of frequency f Hz. Subscripts ($i \neq j \neq k$) on the noise signals emphasize that a different realization of the random noise is presented during each interval (and trial), whereas subscripts on the sine signals emphasize that a different phase for the sine may be presented during each interval. Starred superscripts on the noise indicate that although the noise was random between intervals, the correlation between the noise masker and tone probe was controlled so that adding a sine to the noise resulted in a constant intensity increment regardless of the noise realization.

In Experiment I we verify that our constant spectrum level random noise reproduces the tone versus noise masking results previously observed using Gaussian random noise [7, 8]. Experiment I involves measuring the masked audiogram for (1) a fixed phase tone masker, (2) a 120 Hz wide flat spectrum random noise masker, and (3) a random phase tone masker. All maskers have a center frequency of 1 kHz and are presented at 70 dB SPL. Audiograms are measured using a 2-IFC paradigm.

In Experiment II we measure thresholds for tones masked by SCBW maskers and the $JND_I$ of the SCBW maskers using a 2-IFC paradigm. The masker bandwidths range from 0 Hz (i.e. pure tone) up to 120 Hz (i.e. flat spectrum random noise masker). Again, all maskers have a center frequency of 1 kHz and are presented at 70 dB SPL. The masked threshold measurements are divided into two groups: In the first group, the correlation between the probe and the masker is not controlled; therefore, adding the probe to the random noise results in an intensity increment that is random from trial to trial. In the second group of masking experiments, the correlation between the tone and masker is controlled to give a constant intensity increment from trial to trial while the masking noise waveform remains random.

Experiment III is identical to Experiment II except that a 3-IFC rather than 2-IFC paradigm is employed to measure the thresholds.

Finally, we propose a model and test its validity by predicting all the masked threshold data from the $JND_I$ data.

2 METHODS

2.1 Stimuli

All stimuli were digitally generated at a 40 kHz sampling rate. The stimulus duration was 100 milliseconds. A five millisecond cosine ramp was used to smoothly gate the stimuli on and off.

2.1.1 Maskers

Figure 3B:
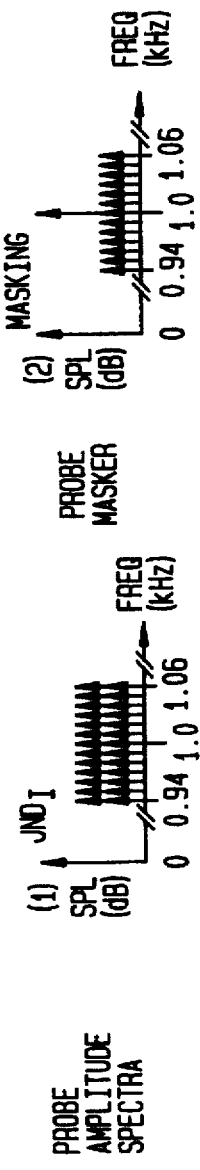
FIG. 3B illustrates amplitude spectra of probes used in the experiments.
Figure 3C:
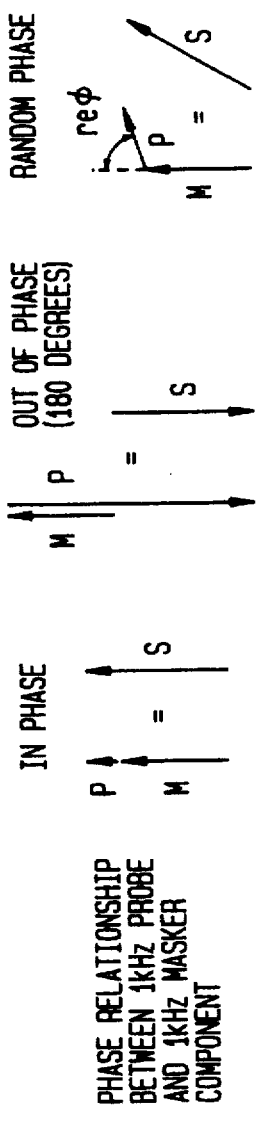
FIG. 3C illustrates phase relationships between the probes and the components of the maskers.

FIG. 3A depicts the amplitude spectra of the three different stimuli used as maskers. Masking stimuli had bandwidths (BW) of zero (i.e. pure tone), 40 Hz, and 120 Hz. All maskers are centered at 1 kHz and presented at 70 dB SPL for a duration of 100 milliseconds. Phases of the noise masker components are random (uniformly distributed). FIG. 3B depicts the amplitude spectra of the probes (gray vectors). The probe was either (1) a scaled copy of the masker ($JND_I$ task), or (2) a 1 kHz tone (masking task). Probe is gated simultaneously with the masker. FIG. 3C shows the phase relationships between the 1 kHz tone probe (P) and the 1 kHz component of the masker (M) in the masking tasks (case #2 in the middle row). The relative phase (re $\phi$) between the probe and masker was either zero (in phase), $\pi$ radians (out of phase), or random (uniformly distributed). The magnitude (vector length) of M and S is the same in all three examples; the magnitude of P differs, depending on the phase relationship.

The narrow band noise (NBN) stimuli were constructed by summing sine waves having equal amplitude (see FIGS. 3A, 3B and 3C) and randomly chosen phase assignments drawn from a uniform distribution. New phase assignments were drawn for each interval and trial. The masking stimuli were always presented at 70 dB-SPL, thus the amplitude of the sine wave components of the NBN are inversely related to the bandwidth of the stimulus (see FIGS. 3A, 3B and 3C). The frequency increment between adjacent sine waves composing the masker is determined by the fundamental frequency of the stimulus. Since the stimulus duration was 100 msec, the fundamental frequency was 10Hz. A 40Hz bandwidth signal centered at 1 kHz contained five components at frequencies 980, 990, 1000, 1010, and 1020 Hz as shown in FIG. 3A.

2.1.2 Probes

Two types of threshold measurements were obtained: (1) $JND_I$ of signals with bandwidths equal to 0, 40, and 120 Hz, and (2) thresholds for tones in the presence of background maskers with bandwidths 0, 40, and 120 Hz. FIG. 3B depicts the amplitude spectra of the probes used in these two detection tasks (probes are represented by gray vectors whereas maskers are represented by black vectors). For the $JND_I$ experiments, the probe is simply a scaled copy of the masker. Adding the probe to the masker produces an intensity increment in the signal (Eq. 8–9). For the masking tasks of Experiments II and III the probe was always a 1 kHz pure tone (i.e. the probe has the same frequency as the center component of the NBN masker). For the masked audiograms of Experiment I the probe was a variable frequency tone.

The phase of the 1 kHz tone probe relative to the center component of the NBN masker was of particular interest in the masking tasks of Experiments II and III. Let the vector P represents the magnitude and phase of the probe $p_T$ and the vector M represents the magnitude and phase of the center (1 kHz) component of the masker $m_T$. FIG. 3C is a vector diagram of the three different relative phase (re $\phi$) conditions between P and M for which we collected data. The probe was added to the masker component in phase (re$\phi$=0), out of phase (re$\phi$=$\pi$ radians), or with a random phase relationship (re$\phi \in [0, 2\pi)$). The length of the vector symbolizes the magnitude of the signal while the relative angle between the M and P vector symbolizes the relative phase relationship. In FIGS. 3A, 3B and 3C, the magnitudes of the masker and the resultant signal (S=M+P) have been held constant across all three cases while the probe magnitude depends on the relative phase of M and P. This depiction emphasizes the differences in probe magnitude necessary to achieve the same signal (S) magnitude as the relative phase between M and P is varied.

2.2 Hardware

Stimuli were digitally generated in real time on a 486 PC. An Ariel DSP-16 converted the signals to analog and was followed by a 15 kHz low pass filter (Wavetek Brickwall Filter). The transducer was constructed by cannibalizing a Yamaha YH-2 headset and placing one of the drivers in an enclosure similar to a Sokolich driver. A piece of airline headset tubing 80 centimeters in length was used to deliver the acoustic stimulus from the driver to the ear. This tubing was terminated with an Etymotic ER-14 foam ear tip. The foam plug was inserted into the auditory meatus of the subject to complete the closed field sound delivery system. Calibration was carried out using a B&K sound level meter and a B&K 4157 coupler. We used SYSid (Ariel Corporation) to measure the distortion in the acoustic system and verified that the level of the distortion products would not influence the results.

2.3 Data collection protocol

Thresholds were measured using either a two interval forced choice (2-IFC) paradigm and/or a 3-IFC paradigm. The 100 msec presentation intervals were separated by 500 msec; there was a 500 msec waiting period before the start of the next presentation after the subject entered their response to the previous trial. A 3-up/1-down adaptive procedure was used in the task to force the algorithm to concentrate measurements near the d'=1 point of the psychometric curve. Subjects were instructed to choose the interval containing the probe. Visual feedback informed the subject whether they selected the correct interval.

2.4 Data analysis

To locate the probe level corresponding to 76% correct, a psychometric function was fit to the data. We assumed that the psychometric function could be approximated by a cumulative normal form when the probe level was expressed in dB-SPL. Rather than fit a cumulative normal to the data, the following logistic function approximation was used [18]:

$$P_{correct}(L_{dB}) = \frac{1}{m}\left(1 + \frac{m-1}{1+\exp(-(L_{dB}-L_M)/L_S)}\right) \quad (10)$$

where $P_{correct}$ is the probability of a correct response, $L_{dB}$ is the probe level in dB, m is the number of alternatives in the m-IFC task (e.g. m=2 or 3 in our experiments), $L_M$ is the "midpoint" of the psychometric function corresponding to $P_{correct}(L_M)=(1+m)/2m$, and $L_S$ is the "spread". In the context of our model, approximating the psychometric functions by a cumulative normal that is a function of probe SPL (dB) is crude at best. Equation 10 is simply a sigmoidal function which provided a visually acceptable fit to the measured psychometric data. Since almost all of the data was clustered around the midpoint of the psychometric function, attempting to find a more accurate (and more complicated) form for the psychometric function would not have resulted in a significant improvement of the fit. A maximum likelihood procedure was used to find the parameters of Eq. 10 that provided the optimal fit of the function to the data. An estimate of the probe level corresponding to $P_{correct}=76\%$ was obtained from this function. To obtain a sufficient number of measurements above and below the 76% criterion to accurately determine $L_s$ while concentrating most of the points in the immediate vicinity of 76% correct to accurately determine $L_m$, the "down" step size was 2 dB until the tenth reversal occurred, then 1 dB until the twentieth reversal occurred and, finally, 0.5 dB until the end of the block of trials. A block of trials ran until 30 reversals occurred. Each of the experiments generally consisted of 1 block yielding an average of ~125 measures per experiment. In some cases, the experiment was repeated and the results of the next block of trials were combined with the previous block of trials. Thus, each threshold estimate was based on the subject's response to approximately 125 to 375 trials. No data was discarded or selected.

2.5 Subjects

We used four subjects in our experiments. All of the subjects had significant previous experience in psychoacoustic tasks. Subject #1 was a male in his 30s; subject #2 was a male in his 50s; subject 03 was a female in her 20s; subject #4 was a male in his 50s. All subjects had normal audiograms except subject #4 who displayed about a 20 dB presbyacusis hearing loss. The first two subjects were the first and second authors, respectively.

3 RESULTS

3.1 Experiment I: Masked audiograms for tone versus noise maskers

3.1.1 Frozen phase tone masker

To verify that our constant spectrum level random noise maskers possess similar masking properties to bandpassed Gaussian noise, we repeated the experiments of Egan and Hake [7], and Ehmer [8]. Masked audiograms were measured for a tone masker and for a 120Hz wide constant spectrum level random noise masker using a tone probe. Both maskers were centered at 1 kHz and presented at an overall SPL of 70 dB. The tone probe and tone masker had the same phase (i.e. frozen) from interval to interval. The random NBN masker had a different waveform from interval to interval. FIG. 4 displays the results. Specifically, FIG. 4 shows masked audiograms using a variable frequency pure tone probe for subject #1. Maskers (1) 120 Hz wide constant spectrum level random noise centered on 1 kHz at 70 dB SPL (solid with *), (2) 1 kHz tone at 70 dB SPL (dashed with o), and (3) in quiet (dotted with x) are used. The tone masker and tone probe are frozen in this experiment (i.e. same phase from interval to interval). Therefore, the correlation between the tone masker and tone probe is constant whereas the correlation between the noise masker and tone probe is random. The masked threshold at 1 kHz is 66 dB SPL for the noise masker and 46 dB SPL for the tone masker. This difference of 20 dB is the focus of this discussion.

FIG. 4 shows the same qualitative result as that demonstrated previously by Egan and Hake who used bandpassed Gaussian noise rather than a constant spectrum level noise masker. That is, the masked threshold at the center frequency of the masker is 20 dB greater for a constant spectrum level random noise masker than for a tone masker. The lower curve shows threshold in quiet.

Several other features in FIG. 4 are also consistent with Egan and Hake's results [7]. In contrast to the large difference in masked thresholds near the maskers' center frequency, masked threshold away from the center frequency is relatively similar for the tone and SCBW noise masker. Egan and Hake ascribed the dips and peaks in the tone masked audiogram to beat listening.

3.1.2 Random phase tone masker

The experiment summarized in FIG. 4 was repeated, however, this time the phase of the tone masker was varied randomly from interval to interval. The tone masker's phase was drawn from a uniform distribution. By randomizing the phase of the tone masker we have made it more like a random noise masker which has this property. FIG. 5 displays the resulting masked audiograms. With the exception of the audiogram for the tone masker, all conditions and results in this figure are the same as those in FIG. 5. The 1 kHz 70 dB SPL tone masker's phase was random from interval to interval in this experiment. The masked threshold at 1 kHz for the random phase tone masker is 73 dB SPL, 27 dB greater than that for the frozen tone masker used in FIG. 5. The masked audiogram for the 120Hz wide noise in FIG. 5 is identical to that shown in the previous figure.

Comparing the masked audiogram for the tone masker in FIG. 4 with that in FIG. 5, we note the following differences: For probe frequencies distant from the tone masker frequency, the contour of masked thresholds is smoother with a random phase tone masker as compared to a fixed phase tone masker. (The dips and peaks associated with the fixed phase masker are apparently due to constructive and destructive summation of probe and masker distortion products on the basilar membrane, not beats as Egan and Hake had suggested.) The contour of the random phase tone masked audiogram closely follows the profile of the NBN masked audiogram. Masked thresholds for the random phase tone are slightly greater than for the NBN for probe frequencies distant from the masker frequency. Relative to the 120Hz NBN masker, the masked threshold for a 1 kHz probe is approximately 10 dB greater if the masking tone has random phase as opposed to 20 dB less when the masking tone has a fixed phase. All of these observations are consistent with the hypothesis that part of the difference in masked thresholds between tone and noise maskors may be due to the different correlations between the probe and masker, and different correlations with the distortion products.

Figure 6:
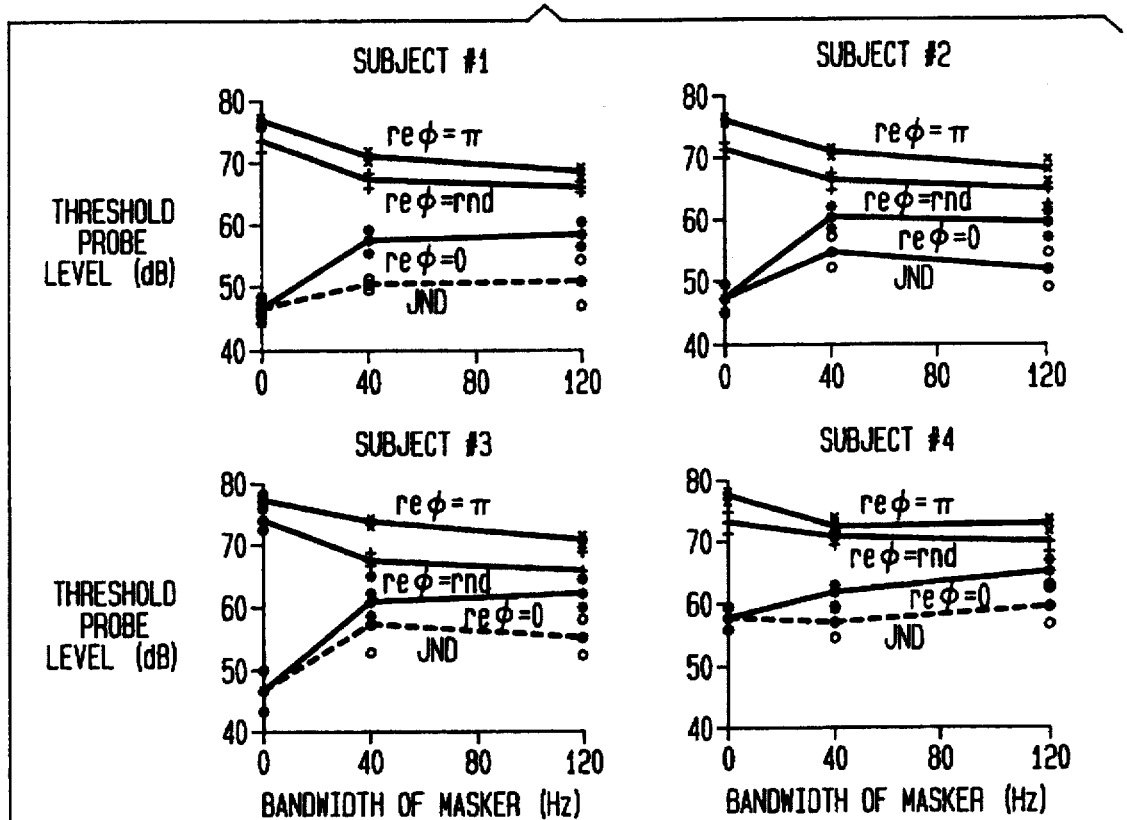
FIG. 6 are plots of probe levels at masked thresholds versus the bandwidth of a masker corresponding to four subjects in a second experiment.

3.2 Experiments II and III: Measurements of masked threshold and $JND_I$ at 1 kHz for various bandwidth maskors 3.2.1 Experiment II: 2-IFC task Just noticeable differences for intensity increments from 70 dB-SPL were measured in the four subjects. FIG. 6 shows plots of probe level at masked threshold (2-IFC 76% correct) versus the bandwidth of the masker. A dashed line corresponds to the $JND_1$ experiment in which the probe was a scaled copy of the masker. Solid lines correspond to the masking experiments in which the probe was a 1 kHz tone. The three different symbols on the masking plots ("*" "+" and "x") correspond to the three different relative phase relationships between the tone probe and the 1 kHz component of the masker ("in phase", "πradians out of phase", and "random phase", respectively). Symbols that are not on a line (i.e. above and below the lines connecting symbols) represent the 95% confidence limits (±2σ) of the estimated thresholds. All maskors, except the tone, are random from interval to interval. Each dashed line in FIG. 6 represents a plot of the observed thresholds versus the bandwidth of the stimulus. Note that the threshold for a JND in intensity tends to be 3 dB to 10 dB greater for a constant spectral level random noise masker (BW>0) as compared to a fixed phase tone masker (BW=0). An energy model would not predict a difference in $JND_I$ between tones and our constant energy noise. The difference between tone and noise $JND_I$ is subject dependent.

The solid lines in FIG. 6 represent plots of detection thresholds for tones in the presence of 70 dB-SPL maskers; the maskers are identical to the stimuli used in the $JND_I$ experiments. There are three curves for the tone masked thresholds representing the three different relative phase relationships between the probe and corresponding masker component: in phase, out of phase, and random relative phase (see FIG. 3C). The three relative phase cases correspond to conditions under which the correlation between the masker and probe is maximally positive (in phase addition), maximally negative (out of phase addition), and random correlation (random relative phase addition). The results of FIG. 6 show that the masked threshold is very sensitive to the nature of the correlation between probe and masker. Indeed, the masked threshold can vary by as much as 10 dB for masker bandwidths approaching a critical band, and by as much as 30 dB for masker bandwidths approaching zero, depending on the correlation.

Figure 7:
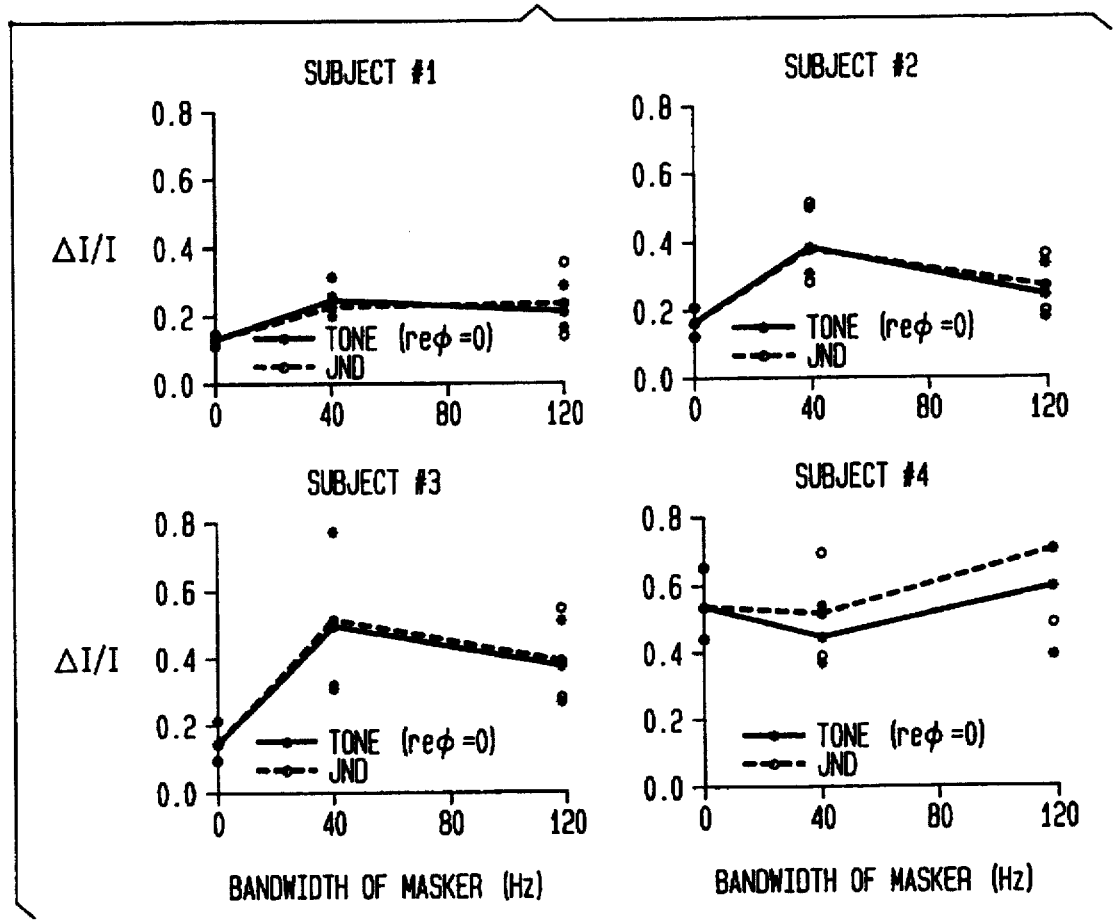
FIG. 7 are plots of the relative intensity increments at masked thresholds versus the bandwidth of the masker corresponding to the four subjects in the second experiment.

To investigate whether the change in intensity caused by adding the tone to the masker was sufficient to account for the performance at masked threshold, the intensity increment at threshold in the masking task was compared to the intensity increment in the $JND_I$ task. FIG. 7 shows plots of the relative intensity increment ($\Delta I/I$) at masked threshold (2-IFC 76% correct) versus the bandwidth of the masker. Two sets of data, corresponding to the $JND_I$ and the tone masked threshold for "in phase addition" are shown; the data and related symbols are the same as those shown in the two lower-most curves of FIG. 6 except that they are plotted in terms of $\Delta I/I$. Symbols that are not on a line (i.e. above and below the lines connecting symbols) represent the 95% confidence limits (±2σ) of the estimated thresholds. Specifically, the data in FIG. 7 corresponding to the two lowermost curves in FIG. 6 has been replotted in terms of the relative intensity change $\Delta I/I$ when the probe is added to the masker. Ordinate values ($\Delta I/I$) in FIG. 7 are computed according to Eq. 7.

FIG. 7 shows that the $\Delta I$s in the $JND_I$ and masking tasks (in phase addition) are identical. Thus the threshold for detecting the tone probe in the presence of the masker is achieved when the intensity increment caused by adding the tone in phase to the masker is equal to the $JND_I$ of the masking stimulus.

A probe tone of larger amplitude is required to achieve the same intensity increment if the tone is not in phase with the corresponding frequency component in the masker. This intuitive result, which can be deduced from Eq. 5, is illustrated in the phaser diagram of FIG. 3C where the length of the probe vector had to be increased as the relative phase between the probe and masker increased to achieve the same signal amplitude.

Figure 8:
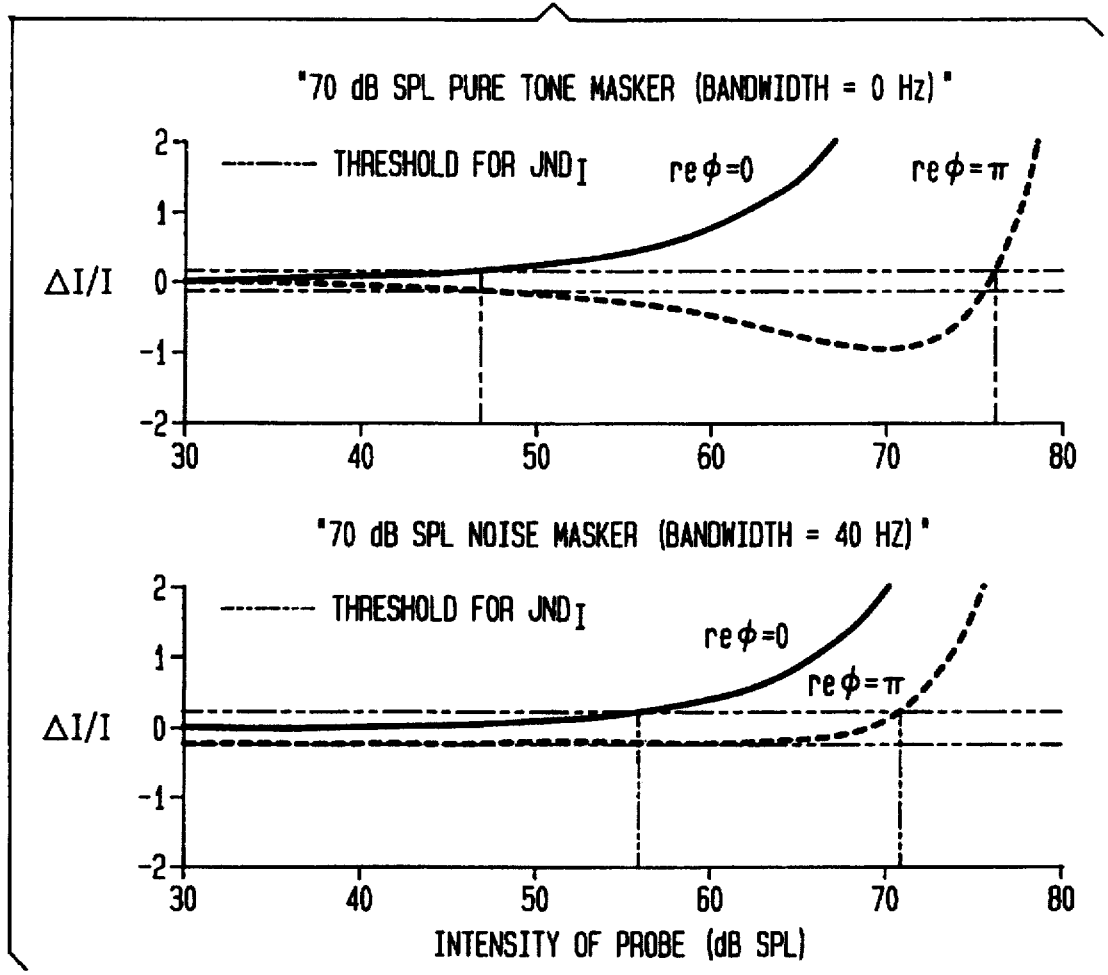
FIG. 8 are plots of the relative intensity increments as a function of probe tone intensity corresponding to two different bandwidths of the masker.

FIG. 8 shows plots of the relative intensity increment $\Delta I/I$ as a function of probe tone intensity. The masker is a tone in the upper graph and a 40 Hz wide constant spectral level noise in the lower graph. In each graph, $\Delta I/I$ is plotted for the case where (1) the probe tone is added "in phase" to the masker (i.e. maximally positive correlation between $m_T$ and $p_T$), and (2) the probe tone is added "π radians out of phase" to the masker (i.e. maximally negative correlation between $m_T$ and $p_T$). Horizontal dash-dot lines show the thresholds for a just noticeable change in stimulus intensity. Vertical dash-dot lines are drawn where the $\Delta I/I$ just exceeds the bound for a just noticeable intensity increment in the two relative phase cases.

Specifically, FIG. 8 plots the relative intensity increment $\Delta I/I$ as a function of the probe intensity for two extreme cases of correlation between the masker and probe. The upper graph depicts the case where the masker is a pure tone (i.e. BW=0 Hz) and the lower graph depicts the case where the masker is a narrow band of noise (BW=40 Hz). The solid line represents the case where the probe is added in phase to the masker (the condition illustrated by the left drawing in FIG. 3C) whereas the dashed line represents a probe added π radians out of phase to the masker (the middle drawing in FIG. 3C). A horizontal dash-dot line has been drawn at the level corresponding to a just noticeable intensity change (about ±0.57 dB for BW=0, and ±1.2 dB for BW=40). Vertical dash-dot lines have been drawn where the in phase and out of phase curves pass through the +0.57 dB and +1.2 dB lines, respectively. The probe intensities corresponding to these intersections are the same as those measured for the in phase and out of phase cases for the 0 and 40 Hz wide maskers in FIG. 6 for subject #1.

3.2.2 Experiment III: 3-IFC task

FIG. 8 also illustrates how psychophysically measured masked threshold is biased by the measurement procedure. Say the subject is instructed to choose the interval containing the probe in a 2-IFC task. A reasonable criterion would be to pick the interval that sounds more tonal. However, for probe intensities near masked threshold, the similarity between $\Delta I/I$s in the masking and $JND_I$ tasks shown in FIG. 7 suggests that the subject relies on an intensity cue. In this case the subject will guess that the more intense interval is most likely to contain the probe. FIG. 8 shows that the intensity of the stimulus may actually decrease when the probe is added to the noise. Thus the subject may pick the incorrect interval even though they correctly identified the more intense interval. On the other hand, if the subject is instructed to identify the interval containing the probe in a 3-IFC task, the subject will select the interval that sounds most different from the other two intervals. Hence the subject will tend to correctly identify the interval containing the probe whether the addition of the probe decreases or increases the intensity by a just noticeable amount. Most importantly, a 3-IFC experiment would demonstrate whether the waveform change associated with adding a tone to a noise masker (e.g. tonality cue) may provide a lower threshold cue for detecting the presence of the probe.

Figure 9:
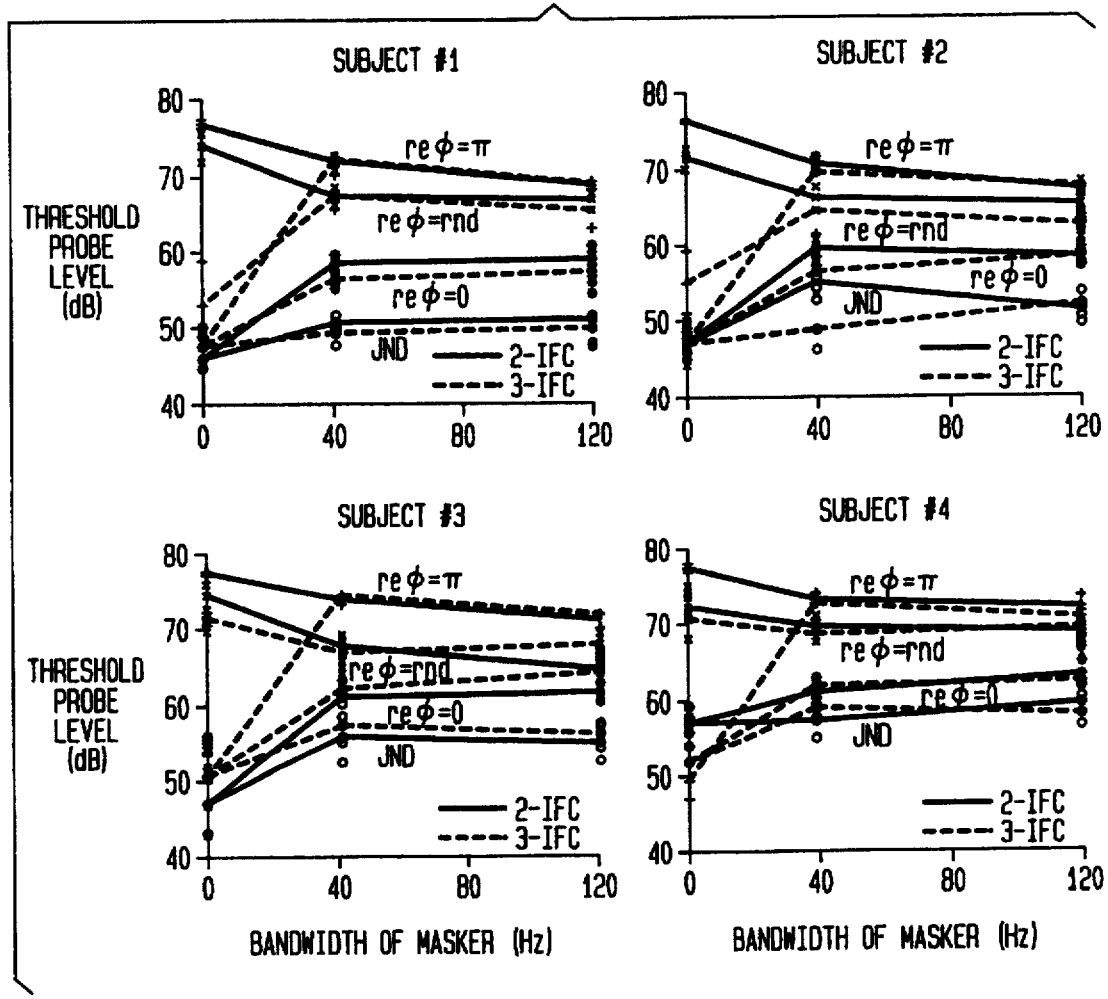
FIG. 9 are plots of probe levels at masked thresholds as a function of the masker bandwidth corresponding to the four subjects in the second experiment and a third experiment.

To resolve the issue as to whether a waveform cue may provide a lower threshold cue, the masking and $JND_I$ experiments were repeated using a 3-IFC paradigm in which the subjects were instructed to select the interval that sounds different. The results of the 3-IFC experiments appear in FIG. 9 where they are plotted against the results from the 2-IFC experiment (previously shown in FIG. 6). Specifically, FIG. 9 shows plots of probe level at masked threshold as a function of masker bandwidth in the 3-IFC task (d'=1 at 63% correct) versus the 2-IFC task (d'=1 at 76% correct). Solid lines connect points measured in the 2-IFC task (same data as in FIG. 6) and dashed lines connect points measured in the 3-IFC task. The four different symbols, "0" "*" "+" and "x" represent data collected in the JND task (i.e. $p_T = \alpha m_T$), and masking tasks where the relative phase relationships between the tone probe and the 1 kHz component of the masker were in phase, $\pi$ radians out of phase, and random phase, respectively. Symbols that are not on a line (i.e. above and below the lines connecting symbols) represent the 95% confidence limits (±2σ) of the estimated thresholds. Thresholds in FIG. 9 are for a detection criterion of d'=1, corresponding to 76% correct in the 2-IFC paradigm and 63% correct in the 3-IFC paradigm. For all subjects there are only two data points for which the results differed between the 3-IFC and 2-IFC paradigms; these points correspond to the case where the probe is added out of phase or with random phase to a tone masker. In the remaining cases, thresholds are roughly the same in the 2-IFC and 3-IFC paradigms.

The results of the 2-IFC and 3-IFC paradigms shown in FIG. 9 are consistent with the hypothesis that subjects base their decision in masking tasks on an intensity cue. The similarities and differences between the results in the two paradigms can be explained by referring to FIG. 8 where $\Delta I/I$ is plotted against the probe intensity. If the masker is a pure tone (upper graph in FIG. 8), a just noticeable decrement in intensity is achieved at approximately the same probe level as a just noticeable increment in intensity for the out of phase and in phase addition, respectively. This explains why the in phase and out of phase cases for a pure tone masker in the 3-IFC paradigm are similar. The random phase case for a tone masker has a slightly greater threshold than the fixed phase cases because the correlation (relative phase relationship) between the probe and masker does not always yield a maximal intensity decrement or increment.

The similarity in results in the two paradigms when the masker is a noise (bandwidth=40 and 120 Hz) can be explained in terms of intensity cues with the aid of the lower graph in FIG. 8. The maximum intensity decrement barely exceeds the threshold for detecting a change in intensity (out of phase case represented by the dashed line in lower FIG. 8). As a result, subjects tend to correctly identify the probe interval only if the presence of the probe causes an intensity increment as in the 2-IFC paradigm. Intensity decrements are even less likely to be detected if the masker bandwidth is greater than 40 Hz because the maximum intensity decrement decreases as the bandwidth of the masker increases. Thus the similarity of masked thresholds for tones in noise in the 2-IFC and 3-IFC paradigms is consistent with intensity providing the lowest threshold cue in these masking experiments.

The results shown in FIGS. 6–9 support the hypothesis that JND in intensity and masked threshold, classically discussed as separate and unrelated psycho-acoustic phenomena, are related to the same physical limitations of the auditory system. This concept is further developed into a model of auditory detection which we will test by attempting to predict all the results shown in FIG. 6 from the $JND_I$ data.

Figure 11:
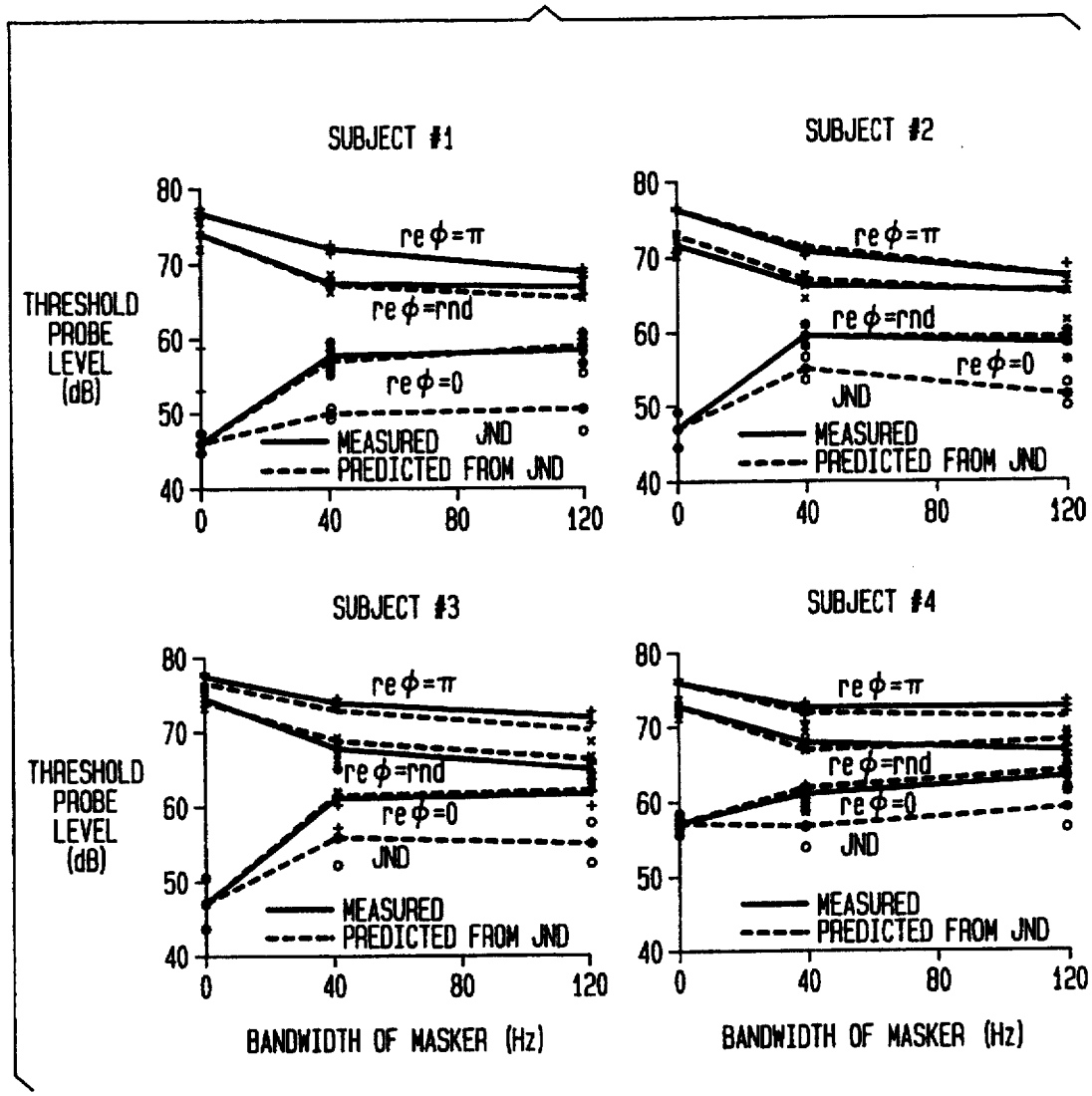
FIG. 11 are plots of the measured masked thresholds from FIG. 6 versus thresholds predicted using the model of FIG. 10 corresponding to the four subjects.

FIG. 11 shows the results of these predictions. In this figure, results from FIG. 6 are plotted against the predicted masked thresholds. The in phase and out of phase predictions are computed as described above and illustrated in FIG. 7. Intuitively, one would expect the random relative phase predictions to fall somewhere between the in phase and out of phase predictions. How to compute the random phase predictions is the subject of the next section.

4 MODEL

4.1 Basic assumptions of the model: The decision variable

We now propose a model that is based on the experimental results summarized in FIGS. 6, 7, and 9. The equality between the threshold $\Delta I/I$ in the masking and the $JND_I$ tasks shown in FIG. 7 suggests that the subject uses a decision variable that is a function of the same stimulus parameters in both tasks. The relevant stimulus parameter is closely related to the intensity of the signal. However, the increase in $\Delta I/I$ as masker bandwidth increased suggests that the decision variable is a function of stimulus waveform as well since the distribution of stimulus intensity did not change as bandwidth was varied.

Figure 10:
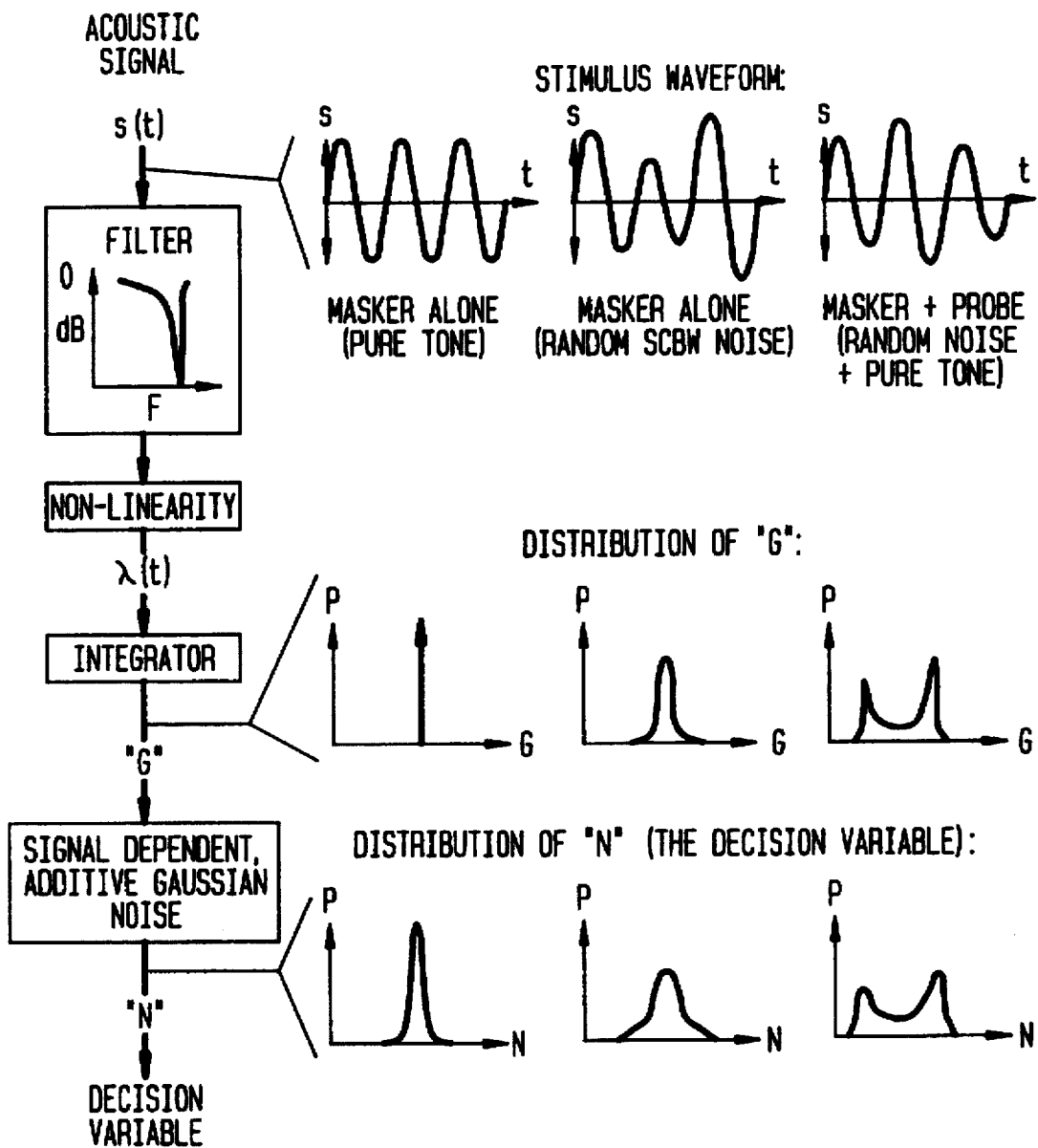
FIG. 10 illustrates a model of auditory detection.

FIG. 10 depicts a model that is consistent with our masking and $JND_I$ data. In this model, the observer bases all their judgments on the output of a hypothetical channel whose value will be referred to as the decision variable. The decision variable is a random function of the input signal. The decision variable function is decomposed into our components which are represented by the four successive processing blocks in FIG. 10. This processing includes a band-pass filter, a non-linear monotonic transformation of the signal, an integrator, followed by the addition of signal dependent internal uncertainty. Since all of the signals used herein have sub-critical bandwidths, we can essentially ignore the effects of the filter whose pass-band is wider than the signal's bandwidth.

We can summarize the relationship between the SCBW stimulus waveform s(t) and the value of the decision variable N in the model as $$N = G + e(G), \quad (11)$$

where, $$G = \int_0^T \lambda(s(t)) dt, \quad (12)$$

function $\lambda$ describes the non-linear transformation of the input signal, T is the duration of the stimulus, and e is a mean zero stochastic process. Random function e represents the internal uncertainty. The uncertainty e is normally distributed with variance that is a function of G:

$$e = \text{Normal}(\mu=0, \sigma^2_G), \quad (13)$$

In section 5 of this discussion we present results which suggest that the non-linear function $\lambda$ is closely related to the loudness growth function. However, for the masking tasks in this discussion, it is sufficient to model $\lambda$ as a power function [26];

$$\lambda(s) \propto s^c, \quad (14)$$

where $c = 2/3$. It will become evident, that for the purpose of relating $JND_I$ to masking, the model is robust with respect to the exact form of the function $\lambda$.

4.2 Representation of stimuli within the model

To the right of the block diagram in FIG. 10 appear three columns of graphs showing signals and distributions at various points in the model for three different inputs. The upper-most row depicts the input acoustic signals. These plots represent snap-shots of a portion of a single presentation of the signal. The remaining rows of graphs are based on multiple presentations of the signal to the system. Hence, the first column represents the case for multiple presentations of a pure tone to the channel; since the pure tone is deterministic, the channel sees the exact same signal during each presentation. The second column represents the case where different realizations of a random SCBW constant spectral level noise have been presented; in this case, the channel sees a different waveform during each presentation. The last column represents the case in which a pure tone has been added to the random SCBW noise used in the middle column; the relative phase between the pure tone and the corresponding component in the SCBW noise is random from trial to trial.

4.2.1 External uncertainty and the distribution of "G"

External uncertainty associated with the stimuli is represented by the distribution of G. For any single stimulus presentation, the value of G is given by the integral of the signal after passing through the non-linearity. For multiple stimulus presentations the value of G may be different for each presentation (if the waveform is random) thus yielding a distribution of G values. If the sum of the non-linearities in the auditory system equaled a square law non-linearity (e.g. energy based detector in which c=2 in Eq. 14) then all individual waveforms in the sample space of constant spectral level noise would yield the exact same value of G. However, because the non-linearity in our model is not a squaring non-linearity, the value of G for any one of these waveforms will be slightly different than the value of G for any of the other waveforms in the sample space. The resulting distribution of G for our noise stimuli is sufficiently close to Gaussian that we can approximate it as $$G(\text{noise}) = \text{Normal}(\mu_{noise}, \sigma^2_{noise}). \quad (15)$$

The ensemble average value of G over the sample space of noise waveforms, $\lambda_{noise}$ in Eq. 15, is approximately equal to that of a pure tone of equal intensity;

$$\mu_{noise} = E[G(\text{noise of intensity I})] = G(\text{tone of intensity I}), \quad (16)$$

where E[G] is the expected value of G. The variance of G, $\sigma^2_{noise}$ in Eq 15 depends on the parameters of the noise (e.g. bandwidth of the noise). The distribution of G given by Eq. 15 is for the case of a constant spectral level (constant intensity) noise input. If the input has a random intensity distribution, as is the case for a tone masked by random noise, the distribution of G will not necessarily be Gaussian. Stimulus based uncertainty is depicted in the second (middle) row of graphs in FIG. 10. These graphs illustrate the probability density functions (PDFs) for G that result from many presentations of the stimuli illustrated in the first row. The abscissa corresponds to the value of G while the ordinate represents the frequency of occurrence (probability) of that value of G. For the case of a pure tone (first column in FIG. 10), this distribution is a delta function since identical copies of the signal pass through the non-linearities during each interval. For the case of random constant intensity SCBW noise (middle column in FIG. 10), this distribution will take the form of a Gaussian (Eq. 15). Finally, for the composite signal consisting of a tone plus the random SCBW noise (last column in FIG. 10), the intensity of the acoustic signal before it enters the channel will vary from trial to trial. This intensity distribution is derived in the Supplement section below. Hence, the PDF of G depicted in the last column of the second row reflects both the variability of intensity in the composite signal due to the interaction of the tone and noise, as well as the variability introduced by the non-linearities.

4.2.2 Internal uncertainty and the distribution of "N"

The PDF of the decision variable N which includes additional uncertainty contributed by the stochastic nature of the neural representation, the internal uncertainty e, is shown in the lower row of graphs. Let us focus on the case for the pure tone depicted in the first column, for the moment. Since the PDF of G for a tone is a delta function, the $JND_I$ for a tone is determined by the variance of e. Thus the variance of e can be inferred from the $\Delta I/I$ for a just noticeable difference in intensity of a tone. Since the $\Delta I/I$ of a tone depends on intensity [33], the "near-miss to Weber's law", the variance of e must depend on G (see Eq. 13) [26, 32, 23, 19]. The lower-left graph illustrates the PDF of N for a tone. This normal distribution has mean G and variance $\sigma^2_G$. In the remaining two columns the distribution of G is not a delta function. If the variance of G is not large, the distribution of e will be approximately the same as that for a tone whose G is equal to the expected value of the noise G (Eq. 16). Since the expected value of G is approximately the same in all three cases, the variance of the internal uncertainty e is approximately the same in all three cases. Thus the PDFs for N in the last two columns can be computed by convolving the distribution of e from the tone case with the PDFs for G in the last two columns. The last row of graphs in FIG. 10 illustrate the results of these convolutions.

4.3 Using the model to predict masked threshold from $JND_I$ data

We hypothesize that the model described in the previous section is predictive of threshold detection tasks requiring the identification of a SCBW probe in the presence of a SCBW masker of equal or greater bandwidth given one caveat: There is no lower threshold information contained in the signal waveform that is not already present in the overall signal intensity. We demonstrated in Experiment III that the stimuli used in this discussion fulfill this requirement. However, take the example where the masking stimulus consists of one or two discrete tones whose frequencies are different from the tone probe. In this case, the observer will detect the presence of "beats" (or a change in the beat rate) before detecting a significant change in the overall intensity when the probe is added to the masker—this represents a case where the waveform of the signal contains information in the form of a predictable temporal intensity cue whose perceptual threshold is lower than the change in the overall intensity of the signal. The latter case can not be accounted for using this model. However, we should be able to account for the $JND_I$ and the detection thresholds for a tone probe or SCBW noise probe added to a SCBW noise masker using this model.

4.3.1 The "unknowns" in the model

Currently, there are two unknowns in the model. The first is the variance of the normally distributed internal uncertainty. This parameter can be inferred from the $JND_I$ for a tone. The second is the exact form of the non-linearity, the function $\lambda$. In the next section we provide evidence that the function $\lambda$ is related to the loudness growth function. The exact form of $\lambda$ is only necessary to predict the $JND_I$ for random SCBW noises. Rather than predict the $JND_I$ for the noise maskers, we will just use their measured values from Experiment II in this section.

4.3.2 Inferring the PDF of "N" from measured $JND_I$

To infer the PDF of N from measurements of $JND_I$, we take advantage of two features in the model. First, since the PDF of N in the $JND_I$ task is equal to the convolution of two normal PDFS, the PDF of G and the PDF of e, N must be normally distributed. Second, the expected value of N is approximately linearly related to the cube root of the signal's intensity (see Eq. 14).

$$E[N_{I+\Delta I}] = E[N_I] + \Delta I \tag{17}$$

$$= E[N_I] + \beta((I + \Delta I)^{1/3} - I^{1/3}), \tag{18}$$

or equivalently $$E[G_{I+\Delta I}] = E[G_I] + \beta((I+\Delta I)^{1/3} - I^{1/3}), \tag{19}$$

where $\beta$ is a constant of proportionality. Thus, according to detection theory the standard deviation of N is related to the $\Delta I$ corresponding to the 76% correct level (i.e. d'=1) in a 2-IFC $JND_I$ task as $$\sigma_N = E[N_{I+\Delta I}] - E[N_I] \tag{20}$$

$$= \beta((I + \Delta I)^{1/3} - I^{1/3}). \tag{21}$$

Since the distribution of G is a delta function if measuring the $JND_I$ for a tone or a frozen noise, $\sigma_N$ is a direct measure of the variance of the internal uncertainty, e. However, since G is normally distributed in a random noise $JND_I$ task, $\sigma_N$ is a measure of the combined internal and external uncertainty.

4.3.3 The PDF of "N" in masking tasks having constant intensity increments

Our results show that the masked threshold for a tone probe which is added with a fixed phase relationship to the corresponding component in the random SCBW masker corresponded to the same $\Delta I/I$ as observed in the respective $JND_I$ experiment (recall FIG. 7). Thus, the intensity increment, regardless of the method by which it is achieved, must yield the same PDF for the decision variable N It is crucial to emphasize that the intensity of the composite tone plus random SCBW noise signal in this case was constant from trial to trial; in other words, the PDF of $\Delta I$ for tone plus noise was a delta function.

4.3.4 The PDF of "N" in masking tasks having random intensity increments

When the phase relationship between the tone probe and the random SCBW noise masker is not controlled, the resulting intensity increment randomly varies from trial to trial. The randomness of the intensity increment represents another source of external uncertainty and must be reflected in the distribution of G and, subsequently, N. This case is illustrated in the right-most column of FIG. 10.

The PDF for N corresponding to the random intensity increment case can be computed as follows: First determine the PDF for $\Delta I$ of the tone plus random SCBW noise; an analytic expression describing this PDF has been derived in the appendix. Then convert this $\Delta I$ PDF to a distribution in N-domain using Eq. 18 and convolve it with the PDF for N which was inferred from the measured $JND_I$ of the random SCBW noise masker.

4.3.5 Computing estimates of tone threshold masked by random SCBW noise

To determine the probability that the subject correctly identifies the interval containing the probe in a 2-IFC task, one has to compute the probability that the value of the decision variable in the tone plus random SCBW noise case is greater than the value of the decision variable in the random SCBW noise alone case:

$$P_c = \int p(N_{masker+probe}=n) \cdot P(N_{masker}<n) dn, \tag{22}$$

where PC is the probability of correctly identifying the interval containing the probe, and P (condition) is the probability of realizing "condition" as determined from the PDFs of N. Note that the result of this integral does not depend on the value of $\beta$.

4.4 Modeling Results

FIG. 11 replots the measured masked thresholds (solid lines) from FIG. 6 and compares them to the masked thresholds predicted from the $JND_I$ thresholds (dashed lines) using our model. Predictions for the probe added to the masker with a fixed phase relationship (in phase, or $\pi$ radians out of phase) are computed by finding the probe tone intensity that corresponds to the same $\Delta I$ as found in the $JND_I$ experiment using that masker (this procedure was illustrated graphically in FIG. 8). Predictions for the probe added to the masker with a random phase relationship are computed by finding the probe level that corresponded to a probability of 76% correct identification in a 2-IFC task. Specifically, the random phase case was predicted by choosing a probe intensity, computing the intensity distributions within the model as described in the previous section, culminating with the evaluation of Eq. 22. This computation was repeated in an iterative fashion until the probe level corresponding to 76% correct was found. The latter search was terminated when the estimated probe level changed by less than ±0.01 dB from iteration to iteration.

The predictions in FIG. 11 were computed using an exponent of c=⅔ in the non-linearity function $\lambda(s)=s^c$. We also found that values for "c" ranging over the decade 0.3 to 3.0 all gave similar predictions (within ±0.2 dB). Since the function $\lambda$ is used to map from the intensity-domain to the N-domain, and since the values of N are distributed over a very limited neighborhood, these predictions are only sensitive to the behavior of $\lambda$ over a small range of values. The insensitivity of these predictions to the value of "c" is simply due to the fact that $\lambda$ can be reasonably approximated by a straight line over the range of interest when its exponent is within the interval [0.3, 3.0].

5 Modeling the non-linearity

In the previous section we developed a model that accurately predicts masked thresholds from the $JND_I$ of the masking signals; we will now outline a model that can predict the $JND_I$ of the masking signals from the $JND_I$ of a tone. The combination of these two models will enable us to predict random signal $JND_I$ and masked thresholds from a single estimate of the internal uncertainty, the tone $JND_I$.

Although only a approximation of $\lambda$ was necessary to predict masked thresholds from the $JND_I$ measurements, a precise description of $\lambda$ is necessary to predict the $JND_I$ of noise signals given the tone $JND_I$. The non-linearity determines how the waveform uncertainty is converted into a perceptual intensity uncertainty. Since the instantaneous intensity of the waveform varies from zero to some large value, we need a precise description of $\lambda$ over this entire range rather than an approximate description over a narrow range as was the case for predicting masked thresholds from $JND_I$.

A logical choice for the non-linearity is the loudness growth function. The decision variable in our model is solely a function of signal intensity, and because the decision variable represents the subjective ranking of stimulus intensity, the loudness growth function relating signal intensity (or pressure) to loudness is consistent with this model. We adopted Fletcher's algebraic approximation to the loudness growth function [10];

$$\lambda(s) = \text{loudness}(s) = \frac{\left(\frac{s}{s_{40}}\right)^{2/3}}{1 + 0.005 / \left(\frac{s}{s_{40}}\right)^2}, \quad (23)$$

where the loudness units are "sones", and $s_{40}$ is the amplitude of a sine wave whose loudness is 40 phons.

To predict the noise $JND_I$, we ran several thousand realizations of the constant spectral level noise stimuli through the model (FIG. 10) with Eq. 23 as the non-linearity to build an estimate of the PDF of G, the external uncertainty. A separate PDF of G was estimated for each bandwidth of noise. The internal uncertainty estimated from the tone $JND_I$ was then convolved with the PDF of G to arrive at the decision variable distribution, the PDF of N. Finally, the $\Delta N$ necessary for 76% correct discrimination was computed and converted to an equivalent $\Delta I$ using Eq. 23.

Figure 12:
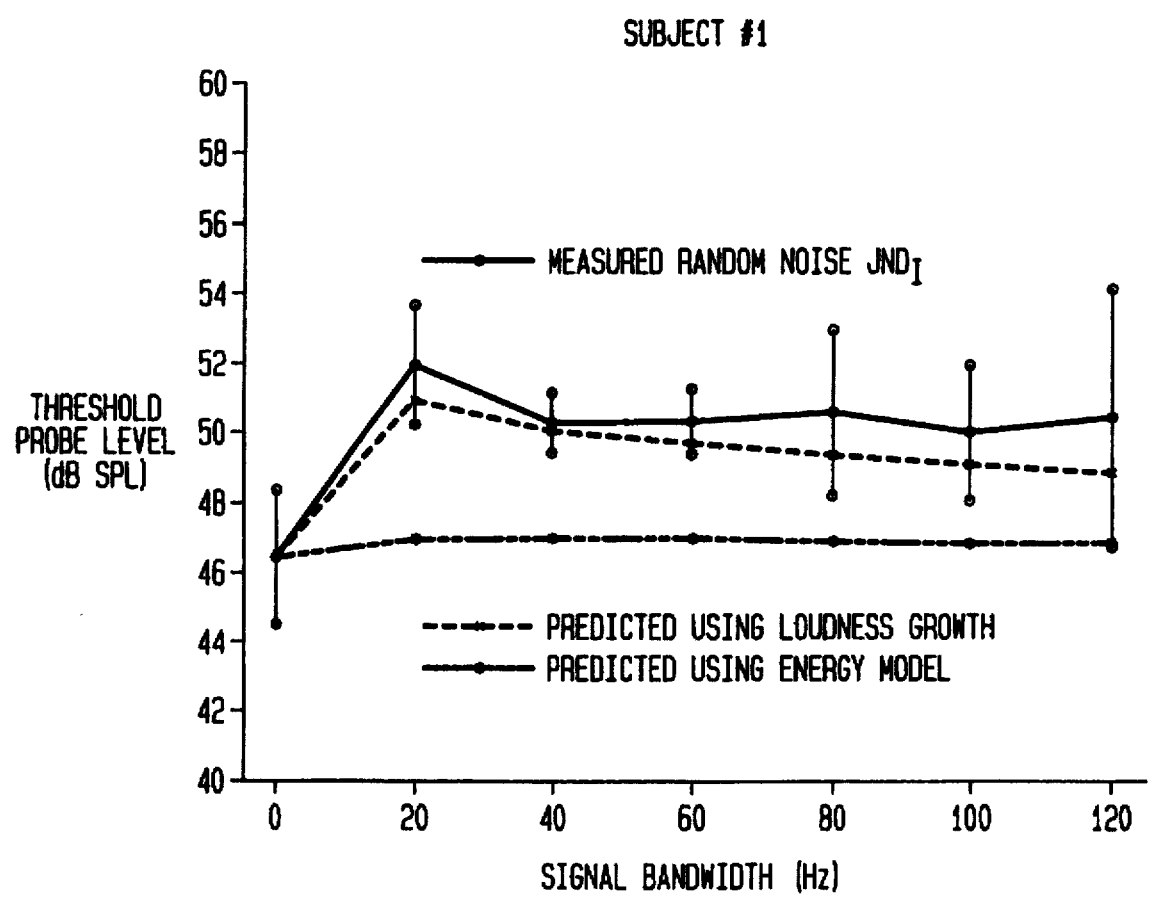
FIG. 12 is a plot of measured just noticeable differences (JNDs) in intensity thresholds versus thresholds predicted using two models of non-linearity.

FIG. 12 displays the constant spectral level noise $JND_I$ predictions along with their measured values for subject #1. In FIG. 12, measured $JND_I$ thresholds are plotted against values predicted using two models of the non-linearity. Measured threshold data are represented by open circles and are connected by solid lines. Upper and lower open circles represent the estimated 95% confidence limits ($\pm 2\sigma$) of the measured thresholds. Data predicted using the loudness and energy models are connected by dashed and dash-dot lines, respectively. Specifically, two separate predictions appear in FIG. 12: (1) predictions using Fletcher's loudness growth function (Eq. 23) as the non-linearity, and (2) predictions using the energy model (Eq. 14 with c=2) as the non-linearity. Quantitatively, the predictions using the loudness growth function as the non-linearity are all within the 95% confidence limits of the measured results. Qualitatively, the predicted $JND_I$ as a function of bandwidth follow the same pattern as the measured $JND_I$. The energy model, on the other hand, completely fails to predict the noise $JND_m$. The $JND_I$ predicted using the energy model for the noise are slightly greater than that for the tone due to the small amount of energy variability introduced by the 5 msec on/off ramps used to gate the random noise.

6 Discussion

6.1 Masking is an intensity discrimination task

In this discussion we set out to explain the dependence of tone masked threshold on the bandwidth of the masking stimulus (i.e. tone versus sub-critical bandwidth random noise maskers) and to develop a quantitative model that predicts tone masked thresholds. We reported the results of several masking and $JND_I$ experiments which showed that human performance in both of these tasks is related to the intensity discrimination limitations of the auditory system.

In FIG. 7 we demonstrated that the relative intensity increment $\Delta I/I$ at masked threshold caused by the addition of a tone to a random narrow band masker is equal to the $JND_I$ of the masker. The masking experiment in FIG. 7 was designed such that the addition of a constant amplitude probe tone caused a constant (deterministic) increment in the intensity of the stimulus from trial to trial even though the waveform of the masking noise was changing from interval to interval. The equality between the threshold intensity increment in the masking and $JND_I$ task of FIG. 7 is a quantitative demonstration of Miller's [27] hypothesis that masking and $JND_I$ tasks are fundamentally related.

Further, the equality in $\Delta I/I$ between the masking and the $JND_I$ task demonstrates that the decision variable upon which the observer bases their decision is a function of the same stimulus attribute, the stimulus intensity. However, the 2-IFC paradigm used to collect these data did not allow us to rule out that an additional waveform cue might also be present but not utilized. We verified that stimulus intensity is sufficient to account for the lowest absolute threshold of detectability by repeating the masking experiment using a 3-IFC paradigm. Although the subjects had at their disposal both a temporal waveform cue and an overall intensity cue to identify the "different" interval in the 3-IFC task, a comparison of the 3-IFC to the 2-IFC results in FIG. 9 demonstrates that the waveform cue does not have a lower threshold than the intensity cue. Incrementing the intensity of the SCBW noise masker by adding an in phase tone (tone masked by noise) and incrementing the intensity by adding a scaled copy of the masker (masker $JND_I$) represents two extreme methods for changing the intensity of the masker without changing its bandwidth. In one case, we changed the amplitude of only one component in the masker's spectrum and in the other case we changed the amplitude of all components in the masker's spectrum. However, the $\Delta I/I$ at detection threshold was the same in these two cases. This observation implies that any SCBW probe whose bandwidth is less than or equal to the masker and causes a constant intensity change when added to the masker (i.e. having a fixed correlation with the masker) will have the same threshold $\Delta I/I$.

When we did not control the correlation (phase relationship) between the tone probe and masker, the experiment was analogous to the standard tone in noise masking task. In this situation the $\Delta I$ varied from trial to trial depending on the particular realization of the noise masker (Eq. 5). This additional uncertainty in the intensity increment is reflected in the distribution of the decision variable. The distribution of the decision variable in this masker plus probe case can no longer be approximated by a linear shift of the masker alone distribution. The distribution of the decision variable will be determined not only by the neural representational uncertainty (the additive Gaussian uncertainty in FIG. 10) and uncertainty contributed by passing a signal with random waveform through a non-linear system, but by the uncertainty in the $\Delta I$ as well. The effect of intensity increment uncertainty on the decision variable distribution is illustrated in the last column of FIG. 10. The $\Delta I$ uncertainty is yet another source that contributes to elevating the masked threshold.

This study was initially motivated by the need to explain the large difference in masked threshold for a tone probe masked by another tone versus an equal intensity narrow band random noise (recall FIG. 8). We can now explain the basis for this difference and, more importantly, we can predict this difference quantitatively. There are three factors that contribute to increase the threshold when the masker is a SCBW random noise rather than a tone. We can break down the significance of each of these factors with the aid of FIG. 13.

Figure 13:
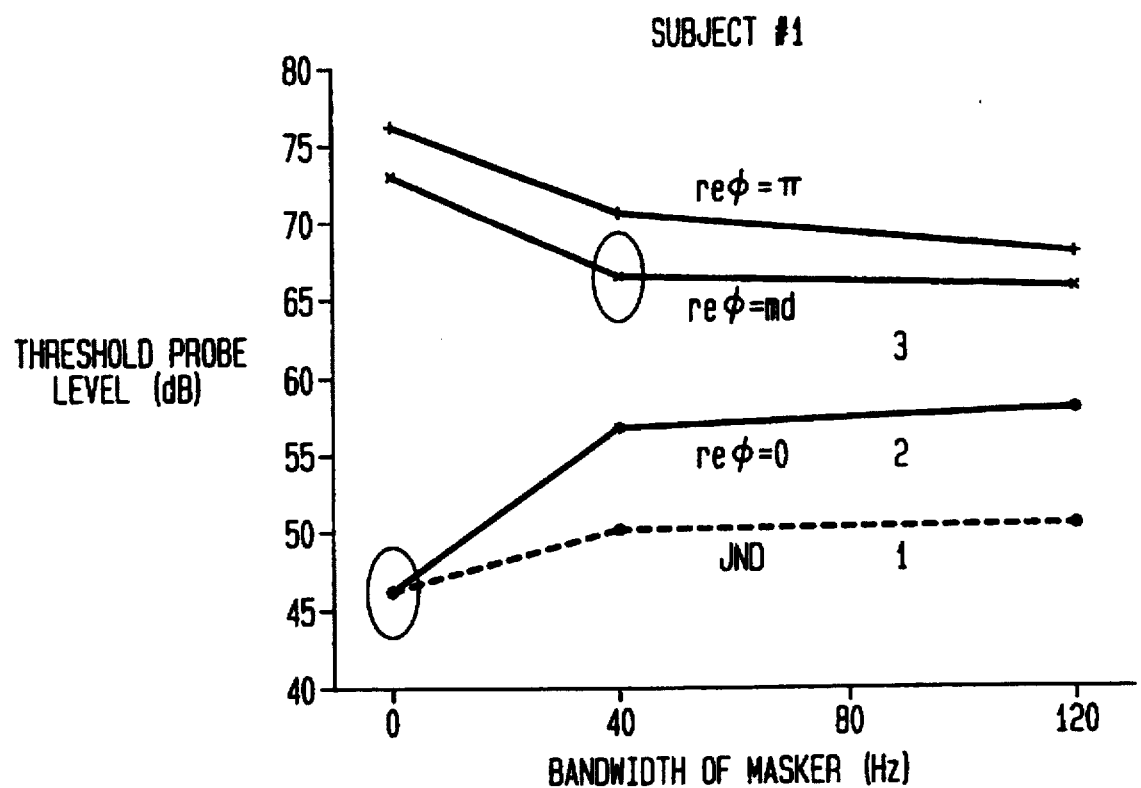
FIG. 13 shows a breakdown of sources of uncertainties for tones masked by noise in the second experiment.

FIG. 13 replots the results for subject #1 from Experiment II (these are the same data as previously shown in FIG. 6). The points in FIG. 13 corresponding to the masked threshold for a tone masked by another tone and for a tone masked by noise are circled. The 21 dB difference in masked threshold between these two maskers is decomposed into three contributions delineated by the horizontal dotted lines. These contributions are (1) the waveform uncertainty associated with the random noise masker, (2) the algebraic consequence of incrementing the intensity of the masker using a tone probe, and (3) the $\Delta I$ uncertainty due to adding a tone to random noise. Specifically, a large circle has been drawn around two data points on this graph that correspond to the masked threshold for a tone masked by a 70 dB SPL tone (threshold=46 dB SPL) and a tone masked by a 70 dB SPL 40Hz wide random noise (threshold =67 dB SPL). A horizontal dotted line has been drawn at the probe level corresponding to masked threshold in the presence of these two maskers. There is the 21 dB difference between these masked thresholds. Two additional horizontal dotted lines have been drawn at the level corresponding to the threshold $JND_I$ of the 40Hz wide noise masker (50 dB SPL) and the masked threshold for a tone added in phase to the same noise masker (57 dB SPL). The areas bounded by the four dotted lines have been numbered 1 through 3. These three areas (increments) show the relative contribution of three factors responsible for the difference between masked threshold for tone versus noise maskers. Increment #1 shows that there is a 4 dB increase in threshold due to the waveform uncertainty associated with the random constant spectral level noise masker. Increment #2 shows that there is a 7 dB increase due to the algebraic consequence of converting the $JND_I$ $\Delta I$ for a noise probe to an equivalent $\Delta I$ for a tone probe added in phase to the masker. Finally, increment #3 shows that there is a 10 dB increase due to the $\Delta I$ uncertainty associated with adding a tone to random noise with no correlation control.

6.2 Relationship between the masker and $JND_I$

We found that the $JND_I$ for constant spectral level SCBW random noise is greater than that for an equal intensity tone (FIG. 7) at the intensities tested. In section 5 we showed that the larger $\Delta I$ for the random noise is the result of a "broadening" of the decision variable distribution due to passing a signal whose waveform varies from interval to interval through a non-linear system. Broadening of the decision variable distribution is reflected as an increase in the $\Delta I$ required to be able to discriminate an intensity increment in the stimulus.

If the input signal's energy is constant amongst intervals as is the case for our flat spectrum noise, the integral of the signal after the non-linearity will not necessarily be constant. Only a system which has a squaring non-linearity followed by an integrator, such as Green's [14] or de Boer's [6] "energy detector" models, would predict a constant value for the decision variable if presented with our constant energy SCBW random noise. We demonstrated in FIG. 12 that the energy detector model fails to predict the increase in $JND_I$ as the bandwidth of the signal is increased from zero. However, using a loudness growth function as the non-linearity does predict the increase in $JND_I$ for noise..

Loudness growth functions vary amongst individuals depending on amount and type of hearing loss [36]. Therefore, since the loudness growth function partially determines a subject's noise $JND_I$, one would expect variability amongst individuals for noise $JND_I$ as we observed. We did not measure loudness growth functions in our experiments. However, subject #4, who had significant presbyacusis hearing loss, did not show a significant change in $JND_I$ as a function of signal bandwidth as the other subjects (see FIG. 6). The observation is consistent with subject #4 having a loudness growth function that is significantly different from the other three subjects. The result further suggests that subject #4's loudness growth function is similar to a squaring non-linearity (i.e. a true "energy detector"). It is interesting to contrast this subject dependent variability in noise $JND_I$ which strongly depends on the form of the non-linearity to the relative lack of variability in masked thresholds for tones in noise which depends on the statistics of the random correlation between masker and probe and only partially on the non-linearity.

Our model also implies that if we had used band-passed Gaussian noise rather than a constant energy SCBW noise, the $JND_I$ would have been even larger. A larger $JND_I$ for narrow band Gaussian noise would be expected because the energy of the signal would vary amongst intervals in addition to the waveform variations, especially for very narrow band signals where energy variance is greatest.

If the stimulus is deterministic (i.e. repeatable waveform) as is the case for a pure tone, passage through the non-linearity will yield the same output signal from interval to interval and thus not contribute additional uncertainty to the signal's level. Our model predicts that the $JND_I$ of all deterministic sub-critical bandwidth signals should be the same. In other words, a "frozen" SCBW noise stimulus should have the same $JND_I$ as an equal intensity tone because both signals present the same waveform to the system non-linearities from interval to interval.

6.3 Relation of the model to previous work 6.3.1 Comparing optimal detectors to the human auditory system The psychoacoustic performance of the auditory system in 2-IFC tasks has been compared to two types of optimal detectors: (1) A detector that compares the energy (or, equivalently, the intensity) in the two intervals [14, 6], and (2) a detector that compares the signal waveforms in the two intervals [21]. If the task is to identify which of two intervals contains a tone, where one interval contains random narrow band Gaussian noise plus the tone and the other interval contains the random noise alone, these two detectors yield identical performance.

Peterson et al. [29] analyzed the performance of an optimal detector designed to discriminate between a masker alone and masker plus probe based on the resulting waveform change for the case of a band-limited, time-truncated Gaussian noise masker. If the probe is a random narrow band Gaussian noise of the same bandwidth and duration as the noise masker (i.e. a noise $JND_f$ task), Peterson et al.'s results are identical to those obtained by Green using a detector whose criterion is the intensity change [14].

Peterson et al. [29] also derived the discriminability of a waveform change resulting from adding a finite duration sinusoid to the random narrow band Gaussian noise masker. The derivation assumed that the sinusoid's frequency was within the pass band of the random noise and that its phase was unknown to the observer. We have derived the detectability of the resulting intensity increment under the same conditions and obtained the same analytic result as that obtained for Peterson's optimal detector based on waveform changes. From this identity we conclude that there is no additional information contained in the waveform of the signal (such as the envelope, or peaks, etc.) that is not already present in the intensity of the signal when discriminating between the Gaussian noise alone and noise plus tone case.

One can get an intuitive feel for these theoretical results by viewing Gaussian noise as a signal whose waveform and spectrum are being "roved" thereby eliminating or minimizing the details of the waveform information. For example, a bandlimited, time-truncated Gaussian noise has a spectrum whose component amplitudes are Rayleigh distributed. Adding a low level tone to this noise will change the amplitude of one of the components in the noise spectrum, however, this amplitude change may not be distinguishable from the inherent random variability of the component's amplitude. The situation is analogous to that for the intensity of the noise which is also random.

In summary, these theoretical results demonstrate that an optimal detector whose decision variable is a function of the signal waveform will not yield better performance than a detector whose decision variable is a function of only the signal intensity in two specific detection tasks relevant to this discussion: (1) Detection of a tone in random narrow band Gaussian noise, and (2) detection of an intensity increment in random narrow band Gaussian noise. These conclusions apply to a detector that is optimal.

However, attempts to quantitatively predict human psychophysical performance using optimal detection models [14, 6, 21] have generally failed. These failures suggest that the human observer performs sub-optimally in auditory detection tasks. Sub-optimal performance in humans is due to both (1) the non-linear distortion of the information contained in the signal waveform as it is transmitted through the auditory system to the site where discrimination actually takes place as well as (2) the limited spectral resolution of the auditory system. In any case, the successes of optimal detection models in qualitatively predicting human performance suggests that these models provide useful insight into psycho-acoustic performance but we must be particularly careful when interpreting the quantitative predictions.

Although the constant spectral level noise used in this discussion does not have the random spectrum of a true Gaussian noise, the results of Experiment III demonstrate that the waveform cue associated with adding a tone to this noise does not have a lower threshold than the intensity cue. If the human auditory system had the capacity to resolve the individual frequency components of a SCBW noise, perhaps the spectral (waveform) cue would provide a lower threshold cue.

6.3.2 Physiological correlates

The development of the model and perspectives presented in this discussion have been influenced not only by the successes of previously published psychoacoustic models but by recent advances in the understanding of neurophysiological signal processing in the central nervous system (CNS). However, the model has been presented as a phenomenological construction due to the difficulty in assigning, with defensible certainty, specific physiological mechanisms to the model elements.

The filter represents the transduction of motion at a fixed point on the basilar membrane to a neural representation of the signal amplitude. This element represents a filter since each point on the basilar membrane is particularly sensitive to a narrow range of frequencies (the critical band).

The non-linearity represents not only the mechanical non-linearities present in the basilar membrane motion but, also, non-linearities contributed by the transduction of membrane motion to auditory nerve impulses by the inner hair cells, and the subsequent non-linearities contributed by neural processing and transmission across synapses to higher order neurons. Hence the stimulus level estimated at the site of cognition will be a function of these system non-linearities [46].

Recent neurophysiological evidence suggests that the representation of acoustic stimulus envelope in the CNS is enhanced in the output of the principal cells of the ventral cochlear nucleus (VCN) relative to the auditory nerve [40, 41]. This suggests that the auditory system may be particularly concerned with preserving, or enhancing, information about the stimulus envelope. Further, it is evident that the neural representation of stimulus envelope in the output of VCN principal cells is a non-linear function of the acoustic stimulus [40, 41]. Neurophysiological evidence also suggests that information about the stimulus envelope is represented in the output of auditory cortical cells, however, this representation appears to be low pass filtered with respect to that in the output of the VCN (see [24] for review). These properties of the central representation of acoustic stimuli are consistent with the notion that information about the stimulus envelope is available to higher (cognitive) centers in the brain, thus providing a foundation for performing comparisons of stimulus envelope over time and comparisons of integrated level.

6.3.3 Psychophysical correlates

The additive internal Gaussian distributed uncertainty is simply an approximate way of accounting for the inherent stochastic nature of the neural encoding. Many psychophysical models have explicitly accounted for this by including an internal source that behaves as an independent additive uncertainty. Most published models assume that the internal uncertainty is Gaussian distributed but they differ in how they model the dependence of the variance on the stimulus. For example, it has been proposed that this variance is proportional to: stimulus intensity [30, 32], the expected value of the decision variable [26, 23, 19], and the square of the stimulus intensity [6] or combinations of the these [47, 32]. It is well known that the statistics of auditory nerve fibers with best frequencies greater than 3 k–5 k Hz can be viewed as a Poisson process that is modified by a refractory dead-time to a first approximation [38, 42, 25]. Thus, if the discrimination process was based on counts of events in the auditory nerve as Fletcher and Munson originally proposed [12], it would be reasonable to assume that the internal variance was related to the expected value of the decision variable as some have suggested [26, 23, 19]. However, as opposed to the auditory nerve, the statistics of neural discharge patterns of principal cells in the auditory CNS can be quite regular as well [3, 43, 1]. Since it is ambiguous as to where the actual discrimination precisely occurs within the auditory system, it is not possible to predict which statistical properties should be assumed for modeling discrimination processes. The success of several conceptually similar models in predicting tone $JND_I$ [26, 23, 19] and loudness growth [23, 19] suggests that the internal uncertainty distribution can be modeled as a Gaussian process whose mean-to-variance ratio is approximately constant over a broad range of intensities.

Since discriminating between different stimuli is a conscious task, it is assumed that the assignment of a value to the decision variable occurs at a cortical level. We model this process as an integration. The transformed and noisy representation of the signal waveform is integrated over its duration to arrive at a value that represents the subjective ranking of the input stimulus, the decision variable. This process can be equivalently viewed as counting the number of action potentials elicited by the stimulus [12, 46]. Temporal details of the signal are ignored by an integrator; however, our experimental results suggest that there is no additional information contained in the temporal details of the waveform if the task is to detect a tone in SCBW noise.

The success of the "loudness model" (Section 5) in predicting the $JND_I$ of constant spectral level random noise suggests a correspondence between the perceived loudness of the signal and the value of the decision variable in our model. It is well known that loudness is a monotonically increasing function of stimulus duration up to several hundred milliseconds [28, 31, 34]. Thus the integration element in our model should ultimately incorporate a time weighting function that represents the duration over which the subject can integrate the signal level (i.e. a leaky integrator). This "leaky" integrator can be equivalently viewed as a low-pass filter with a time constant on the order of hundreds of milliseconds. We assume that our 100 millisecond stimuli were short enough to not be affected by the integration limits of the auditory system and, therefore, did not incorporate this feature into the model. The low-pass filter represented by the integrator in our model is distinct from and dominates the lowpass filtering contributed by brainstem neural processing which has a time constant on the order of milliseconds. This low-pass filtering which is inherent to all neurons probably limits the detectability of amplitude modulations in the signal.

It has been shown that the perceived loudness of a pure tone and a narrow band noise (BW<CB) of equal intensity (i.e. equal RMS SPL) is the same [9]. This relationship probably is not strictly true since the filters are not rectangular, however, departures from this relationship do not exceed the error in published loudness matching results. Hence, the non-linearity in our model must fulfill this requirement (see Eq. 16).

6.4 Conclusions

Historically, masking and just noticeable differences in intensity have been addressed as separate phenomena. Several papers have hypothesized a connection between the two phenomena. Our results demonstrate this connection quantitatively.

Masking and $JND_I$ are both related to the same fundamental AI limitations of the auditory system.

Overall intensity change is the lowest threshold cue for detection of tones in noise.

Masked thresholds for arbitrary probes can be accurately predicted given the $JND_I$ of the masking stimulus and the correlation between the probe and masker.

Non-linearities in the auditory system contribute to the difference between tone and random noise $JND_I$.

If the non-linearities in the auditory system are known, it is possible to predict masked thresholds for probes in the presence of any sub-critical bandwidth masker given only the $JND_I$ for a pure tone (which specifies the distribution of the additive internal uncertainty).

The difference in masking efficacy of tone versus random noise maskers is due to (1) The increase in the $JND_I$ due to the random waveform of the masker, and (2) the uncertainty in the intensity increment resulting from adding the probe to the random masker.

7 SUPPLEMENT

7.1 Amplitude distribution of the sum of two sinusoids with random relative phase Derivation of the amplitude distribution for the sum of two sinusoidal signals with random relative phase:

Let $$a(t) = A \cos(\omega_0 + \phi_a), \tag{24}$$

$$b(t) = B \cos(\omega_0 + \phi_b), \tag{25}$$

$$\phi = \phi_a - \phi_b, \tag{26}$$

$$y(t) = a(t) + b(t), \tag{27}$$
$$= Y \cos(\omega_0 + \phi_y), \tag{28}$$

and $$f_\phi(\phi) = \begin{cases} \dfrac{1}{\pi} & \text{for } 0 \leq \phi \leq \pi \\ 0 & \text{otherwise} \end{cases} \tag{30}$$

(i.e. $\phi$ is uniformly distributed over the interval $[0,\pi]$.)

Figure 14:
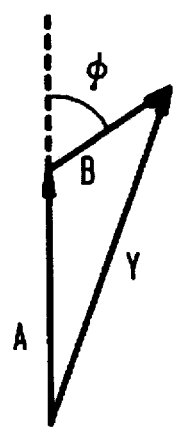
FIG. 14 is a phaser diagram for computing a probability distribution.

Referring to FIG. 14 which shows a phaser diagram, find the distribution of Y, $f_Y(Y)$, using the relationship $$F_Y(Y) = f_\phi(\phi) \frac{dY}{d\phi} \tag{31}$$

where $$Y = \sqrt{A^2 + B^2 + 2AB \cos\phi} \tag{32}$$

$$-\frac{dY}{d\phi} = \frac{-AB \sin\phi}{\sqrt{A^2 + B^2 + 2AB \cos\phi}} \tag{33}$$

Combining Equations 31–33 and the relationship $$\sin(x) = \pm \sqrt{1 - \cos^2(x)}, \tag{34}$$

we get $$f_Y(Y) = \frac{Y}{\pi AB \left\{ 1 - \left[ \dfrac{Y^2 - (A^2 + B^2)}{2AB} \right]^2 \right\}}.$$

7.2 Intensity distribution when a flat spectrum noise masker is added to a random phase tone Here we derive the intensity distribution of the masker+probe signal when the masker is a flat spectrum NBN of the type discussed in the Methods section and when the probe is a sinusoidal signal with the same frequency as one of the components of the SCBW noise. We have already discussed the case where the probe is added with some fixed phase relationship to the corresponding SCBW noise component; this case was trivial since the resultant intensity distribution is a constant. We now assume that the phase relationship between the probe and SCBW noise component is uniformly distributed and use Equation 34 to derive an analytic expression for the intensity distribution as a function of the masker bandwidth and intensity, and probe intensity. The distribution is expressed in decibels relative to the masker intensity.

Assume that when the masker is of zero bandwidth (a pure tone) its amplitude is $A_{Ob\omega}$. Then, as one increases the bandwidth of the masker while maintaining the same RMS, each sinusoidal component of the masker will have an amplitude of $A_{comp}=A_{Ob\omega}/\sqrt{N_{comp}}$, where $N_{comp}$ is the number of components. If we define B to be the amplitude of the tone probe, then the intensity of the masker+probe signal, $Z_{dB}$ is given by $$Z_{dB}=10\ \log[(N_{comp}-1)A^2_{comp}-Y^2] \quad (35)$$

where Y is the amplitude of the sinusoidal signal resulting from adding the probe to the corresponding component of the masker, $Y=\|a_{comp}+b\|$. Our objective is to derive an analytic expression for the distribution of $Z_{dB}$ relative to the masker alone intensity.

The distribution of $Z_{dB}$ can be determined from Eqs. 35 and 34 using $$f_z(Z)=f_Y(Y)\frac{dZ}{dY}, \quad (36)$$

where $f_y(Y)$ is given by Eq. 34, and $$\frac{dZ}{dY}=\frac{20Y}{\ln 10[(N_{comp}-1)A^2_{comp}+Y^2]}. \quad (37)$$

After some substitutions, we find that $$f_z(Z)=\frac{\ln 10\ 10^{Z/10}}{20\pi A_{comp}B\sqrt{1-\left[\frac{10^{Z/10}-A^2-B^2}{2A_{comp}B}\right]^2}}. \quad (38)$$

8 REFERENCES

[1] Carol C. Blackburn and Murray B. Sachs, "Classification of Unit Types in the Anteroventral Cochlear Nucleus: PST Histograms and Regularity Analysis," *J. Neurophysiol.*, 62(6):1303–29, December 1989.

[2] C. E. Bos and E. de Boer, "Masking and Discrimination," *J. Acoust. Soc. Am.*, 39(4): 708–15, 1966.

[3] T. R. Bourk, "Electrical Responses of Neural Units in the Anteroventral Cochlear Nucleus of the cat," PhD thesis, Massachusetts Institute of Technology, Cambridge, Mass., 1976.

[4] Soren Buus, "Level Discrimination of Frozen and Random Noise," *J. Acoust. Soc. Am.*, 87(6): 2643–54, June 1990.

[5] E. de Boer, "Note on the Critical Bandwidth," *J. Acoust. Soc. Am.*, 34(7): 985–986, July 1962.

[6] E. de Boer, "Intensity Discrimination of Fluctuating Signals," *J. Acoust. Soc. Am.*, 40 (3): 552–60, 1966.

[7] James P. Egan and Harold W. Hake, "On the Masking Patterns of a Simple Auditory Stimulus," *J. Acoust. Soc. Am.*, 22(5): 622–30, September 1950.

[8] Richard H. Ehmer, "Masking by Tones vs Noise Bands," *J. Acoust. Soc. Am.*, 31(9): 1253–6, September 1959.

[9] R. Feldkeller and E. Zwicker, "Das Ohr als Nachrichtenempfänger," S. Hirzel Verlag, Stuttgart, 1956.

[10] Harvey Fletcher, "Speech and Hearing in Communication," Robert E. Krieger Publishing Co., Huntington, N.Y., 1972 (1953).

[11] Harvey Fletcher and R. H. Galt, "Perception of Speech and its Relation to Telephony," *J. Acoust. Soc. Am.*, 22: 89–151, 1950.

[12] Harvey Fletcher and W. A. Munson, "Loudness, its Definition, Measurement, and Calculation," *J. Acoust. Soc. Am.*, 5: 82–108, 1933.

[13] Harvey Fletcher and W. A. Munson, "Relation between Loudness and Masking," *J. Acoust. Soc. Am.*, 9: 1–10, 1937.

[14] David M. Green, "Auditory Detection of a Noise Signal," *J. Acoust. Soc. Am.*, 32 (1): 121–31, January 1960.

[15] David M. Green and John A. Swets, "Signal Detection Theory and Psychophysics," John Wiley and Sons, Inc., New York, 1966.

[16] Donald D. Greenwood, "Auditory Masking and the Critical Band," *J. Acoust. Soc. Am.*, 33(4): 484–502, April 1961.

[17] Donald D. Greenwood, "The Intensity DL of Tones: Dependence of Signal/Masker Ratio on Tone Level and on Spectrum of Added Noise," *Hear. Res.*, 65: 1–39, 1993.

[18] Joe L. Hall, "Hybrid Adaptive Procedure for Estimation of Psychometric Functions," *J. Acoust. Soc. Am.*, 69(6): 1763–9, June 1981.

[19] William S. Hellman and Rhona P. Hellman, "Intensity Discrimination as the Driving Force for Loudness. Application to Pure Tones in Quiet," *J. Acoust. Soc. Am.*, 87(3): 1255–65, March 1990.

[20] I. J. Hirsh, W. A. Rosenblith, and W. D. Ward, "The Masking of Clicks by Pure Tones and Bands of Noise," *J. Acoust. Soc. Am.*, 22(5): 631–7, September 1950.

[21] Lloyd A. Jeffress, "Stimulus-oriented Approach to Detection," *J. Acoust. Soc. Am.*, 36(4): 766–74, April 1964.

[22] James D. Johnston and Karlheinz Brandenburg, "Wideband Coding—Perceptual Considerations for Speech and Music," In Sadaoki Furui and M. Mohan Sondhi, editors, *Advances in Speech Signal Processing*, pages 109–140. Marcel Dekker, Inc., New York, 1992.

[23] Gerard Lachs, Radhi Al-Shaikh, Rosalie A. Saia, and Malvin C. Teich, "A Neural Counting Model Based on Physiological Characteristics of the Peripheral Auditory Aystem. v. Application to Loudness Estimation and intensity Discrimination," *IEEE Trans. Syst., Man, Cybern.*, SMC-14 (16): 819–36, November 1984.

[24] Gerald Langner, "Periodicity Coding in the Auditory System," *Hear. Res.*, 60: 115–42, 1992.

[25] June Li, "Estimation of the Recovery Discharge Probability in Cat Auditory Nerve Spike Trains and Computer Simulations," PhD thesis, The Johns Hopkins University, Baltimore, Md., May 1991.

[26] W. J. McGill and J. P. Goldberg, "Pure-tone Intensity Discrimination and Energy Detection," *J. Acoust. Soc. Am.*, 44 (2): 576–81, 1968.

[27] George A. Miller, "Sensitivity to Changes in the Intensity of White Noise and its Relation to Masking and Loudness," *J. Acoust. Soc. Am.*, 19(4): 609–19, July 1947.

[28] W. A. Munson, "The Growth of Auditory Sensation," *J. Acoust. Soc. Am.*, 19 (4): 584–91, July 1947.

[29] W. W. Peterson, T. G. Birdsall, and W. C. Fox, "The Theory of Signal Detectability," *Inst. Radio Engrs. Trans. Grp. Inf. Theory*, 4: 171–212, 1954.

[30] Sheila M. Pfafflin and M. V. Mathews, "Energy-detection Model of Monaural Auditory Detection," *J. Acoust. Soc. Am.*, 34(12): 1842–53, December 1962.

[31] E. Port, "Ueber die Lautstärke einzelner kurzer Schallimpulse," *Acustica*, 13: 212–23, 1963.

[32] David H. Raab and Israel A. Goldberg, "Auditory Intensity Discrimination with Bursts of Reproducible Noise," *J. Acoust. Soc. Am.*, 57 (2): 437–47, February 1975.

[33] R. R. Riesz, "The Differential Sensitivity of the Ear for Pure Tones," *Phys. Rev.*, 31: 867–75, 1928.

[34] Bertram Scharf, "Loudness," In Edward C. Carterette and Morton P. Friedman, editors, *Handbook of Perception*, volume IV Hearing, pages 187–242. Academic Press, N.Y., 1978.

[35] M. R. Schroeder, B. S. Atal, and J. L. Hall, "Optimizing Digital Speech Coders by Exploiting Masking Properties of the Human Ear," *J. Acoust. Soc. Am.*, 66 (6): 1647–52, December 1979.

[36] John C. Steinberg and Mark B. Gardner, "On the Auditory Significance of the Term Hearing Loss," *J. Acoust. Soc. Am.*, 11: 270–7, January 1940.

[37] S. S. Stevens and H. Davis. Hearing, "Its Psychology and Physiology," Reprinted by the American Inst. *Physics for the Acoust. Soc. Am.*, 1983, 1983 (1938).

[38] M. C. Teich and S. M. Khanna, "Pulse-number Distribution for the Neural Spike Train in the Cat's Auditory Nerve," *J. Acoust. Soc. Am.*, 77: 1110–28, 1985.

[39] Raymond N. J. Veldhuis, "Bit rates in audio source coding," *IEEE J. Select. Areas Commun.*, 10(1): 86–96, January 1992.

[40] Xiaoqin Wang and Murray B. Sachs, "Neural Encoding of Single-formant Stimuli in the cat ii. Responses of Auditory Nerve Fibers," *J. Neurophysiol.*, 70 (3): 1054–75, September 1993.

[41] Xiaoqin Wang and Murray B. Sachs, "Neural Encoding of Single-formant Stimuli in the Cat ii. Responses of Anteroventral Cochlear Nucleus Units," *J. Neurophysiol.*, (in press), 1994.

[42] E. D. Young and Patrick E. Barta, "Rate Responses of Auditory Nerve Fibers to Tones in Noise Near Masked Threshold," *J. Acoust. Soc. Am.*, 79(2): 426–42, February 1986.

[43] Eric D. Young, Jeanne-Marie Robert, and William P. Shofner, "Regularity and Latency of Units in the Ventral Cochlear Nucleus: Implications for Unit Classification and Generation of Response Properties," *J. Neurophysiol.*, 60(1): 1–29, July 1988.

[44] I. M. Young and C. H. Wenner, "Masking of White Noise by Pure Tone, Frequency Modulated Tone, and Narrow-band Noise," *J. Acoust. Soc. Am.*, 41(3): 700–6, November 1966.

[45] Eberhard Zwicker and Bertram Scharf, "A Model of Loudness Summation," *Psychological Review*, 72 (1): 3–26, 1965.

[46] Josef J. Zwislocki, "Temporal Summation of Loudness: An Analysis," *J. Acoust. Soc. Am.*, 46(2): 431–441, 1969.

[47] Josef J. Zwislocki and Herbert N. Jordan, "On the Relations of Intensity JNDs to Loudness and Neural Noise," *J. Acoust. Soc. Am.*, 79(3): 772–80, March 1986.

An Illustrative Embodiment

For clarity of explanation, the illustrative embodiment of the present invention is presented as comprising individual functional blocks (including functional blocks labeled as "processors"). The functions these blocks represent may be provided through the use of either shared or dedicated hardware, including, but not limited to, hardware capable of executing software. For example, the functions of processors presented in FIGS. 15 and 16 may be provided by a single shared processor. (Use of the term "processor" should not be construed to refer exclusively to hardware capable of executing software.)

Illustrative embodiments may comprise digital signal processor (DSP) hardware, such as the AT&T DSP16 or DSP32C, read-only memory (ROM) for storing software performing the operations discussed below, and random access memory (RAM) for storing DSP results. Very large scale integration (VLSI) hardware embodiments, as well as custom VLSI circuitry in combination with a general purpose DSP circuit, may also be provided.

Figure 15:
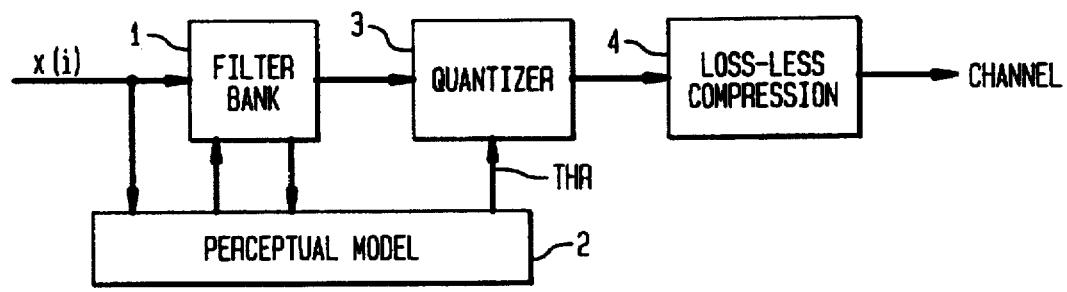
FIG. 15 presents a schematic overview of a prior art perceptual audio coding compression) system of the type described in the above-referenced patents and applications.

FIG. 15 presents a schematic overview of a prior art perceptual audio coding compression) system of the type described in the above-referenced patents and applications. The system receives an audio signal, x(i), and passes it to both a filterbank 1 and a perceptual model 2. The filterbank 1, typically realized as a modified discrete cosine transform (MDCT), divides the incoming audio signal into a plurality of subbands. These subbands (MDCT coefficients) are grouped into coder bands by quantizer 3 for purposes of quantization, as is conventional in the art. These coder bands approximate the well-known critical bands of the human auditory system. The quantizer 3 quantizes the MDCT subbands corresponding to a given coder band with the same quantizer stepsize.

The perceptual model 2 performs the function of analyzing the audio signal and determining the appropriate level of quantization (i.e., stepsize) for each coder band. This level of quantization is determined based on an assessment of how well the audio signal in a given coder band will mask noise. As part of this assessment, prior art systems have employed a tonality calculation for audio signals in the band.

Quantizer 3 generates quantized output signals for application to loss-less compression system 4. System 4 applies a conventional process, such as Huffman compression, and generates an output bit stream for transmission over the channel. The channel may comprise an actual transmission channel (such as a wired or wireless transmission channel, a telecommunications network, the Internet or other computer networks, LANs, WANs, MANs, etc.) and/or a storage medium (such as a compact disk (CD), CD-ROM, semiconductor memory, magnetic tape or disk, optical storage, etc).

The embodiment of the present invention relates to a new method of assessing tonality of a signal for use in signal compression. Signal tonality is a measure determined as part of the threshold (stepsize) computation of the perceptual model 2 of FIG. 15. A perceptual model in a form suitable for use with the present invention is presented in FIG. 16. As shown in the Figure, the audio signal is presented to model 2 wherein it is processed by conventional fast Fourier Transform (FFT) processor 21. FFT processor 21 receives 2048 samples of the audio signal corresponding to a 50% overlap of the FFT window and yields an FFT of 1024 complex coefficients. Window functions suitable for use in this calculation are discussed in the above-referenced patent applications. These coefficients are provided to tonality calculation 27 and to energy calculation 23. Energy calculation 23 and spreading function 25 serve to transform FFT information to a domain approximating the well-known critical band response of the ear. The output of tonality calculation 27 and spreading function 25 are provided to masking threshold processor 28 for computation of a masking threshold. The masking threshold represents an estimate of the level of noise that would be inaudible if added to the signal and is a function of computed tonality. Post processor 29 performs such functions as time domain noise masking (pre-echo) control, spatial domain noise masking control, and absolute threshold adjustments. The result of post-processing 29 are threshold values provided to quantizer 3. Energy calculation 23, cochlear spreading function 25, threshold masking 28 and post-processing 29 are discussed in detail in the referenced applications.

Figure 17:
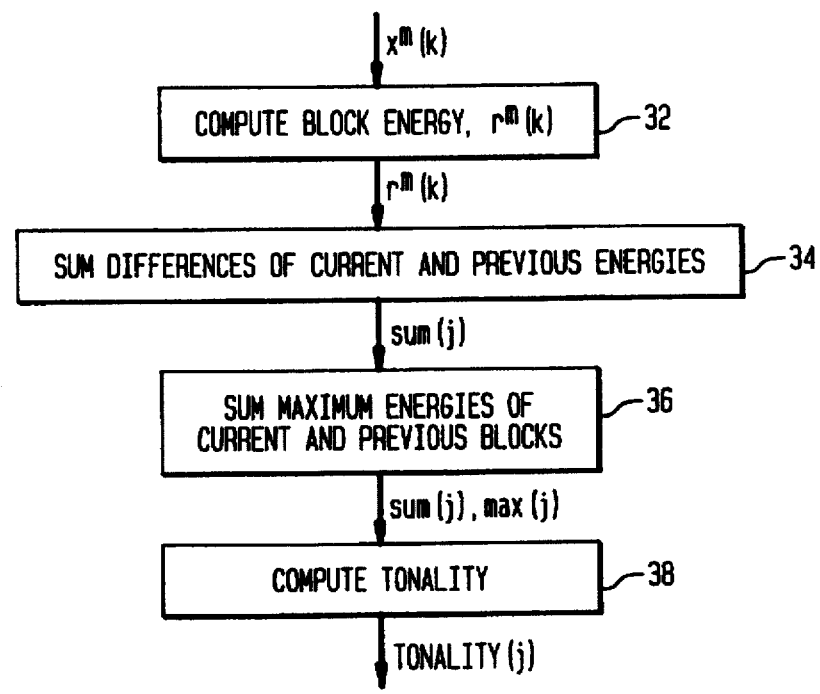
FIG. 17 presents a flow diagram of the tonality calculation in accordance with the present invention.

FIG. 17 presents a flow diagram of the tonality calculation 27 in accordance with the present invention. The complex FFT coefficients, $x^m(k)$, comprising real and imaginary components, are input to the process step 32:

$$x^m(k) = re^m(k) + j \cdot im^m(k),$$

where k indexes the coefficients and m indexes the signal block. The energy of the block, $r^m(k)$, is computed at step 32 as the sum of the squares of real and imaginary components of the coefficients:

$$r^m(k) = [re^m(k)]^2 + [im^m(k)]^2.$$

For each of a plurality of groups (or partitions) of FFT coefficients, j, a summation of all differences between current and previous coefficient energies is computed at step 34:

$$\text{sum}(j) = \sum_{k=k_1(j)}^{k_1(j-1)-1} |r^m(k) - r^{(m-1)}(k)|.$$

In addition, a summation of the maximum energies between current and previous coefficient energies is computed at step 36:

$$\max(j) = \sum_{k=k_1(j)}^{k_1(j-1)-1} \max[r^m(k), r^{(m-1)}(k)],$$

where $k_1(j)$ is the first FFT coefficient in the group. Tonality is then computed at step 38 as follows:

$$\text{tonality }(j) = 1 - \text{sum}(j)/\max(j).$$

The term sum(j) is a measure of the variability (or uncertainty) in the amplitude of the audio signal over consecutive blocks of the audio signal. The term max(j) serves to normalize this value so that tonality may be expressed in a range of values between 0 and 1, with 0 representing a signal determined to be highly tone-like (e.g., a pure tone) and 1 representing a signal determined to be highly noise-like (e.g., a random signal). Chaos, as distinct from tonality, is merely 1- tonality (j). For purposes of this application, the term "tone-likeness" should be construed broadly to mean a measure of "tonality" or "chaos," since either tonality or chaos will describe how noise-like a signal is, just on different scales with opposite conventions.

Figure 16:
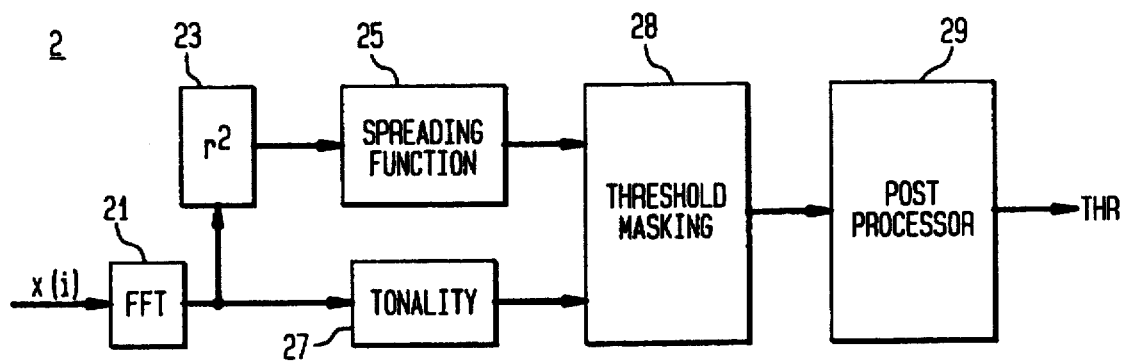
FIG. 16 presents a perceptual model in a form suitable for use with the present invention.

The output of tonality processor 27 is provided to threshold masking 28 as shown in the FIG. 16.

Although a specific embodiment of this invention has been shown and described herein, it is to be understood that this embodiment is merely illustrative of the many possible specific arrangements which can be devised in application of the principles of the invention. Numerous and varied other arrangements can be devised in accordance with these principles by those of ordinary skill in the art without departing from the spirit and scope of the invention.

Figure 18:
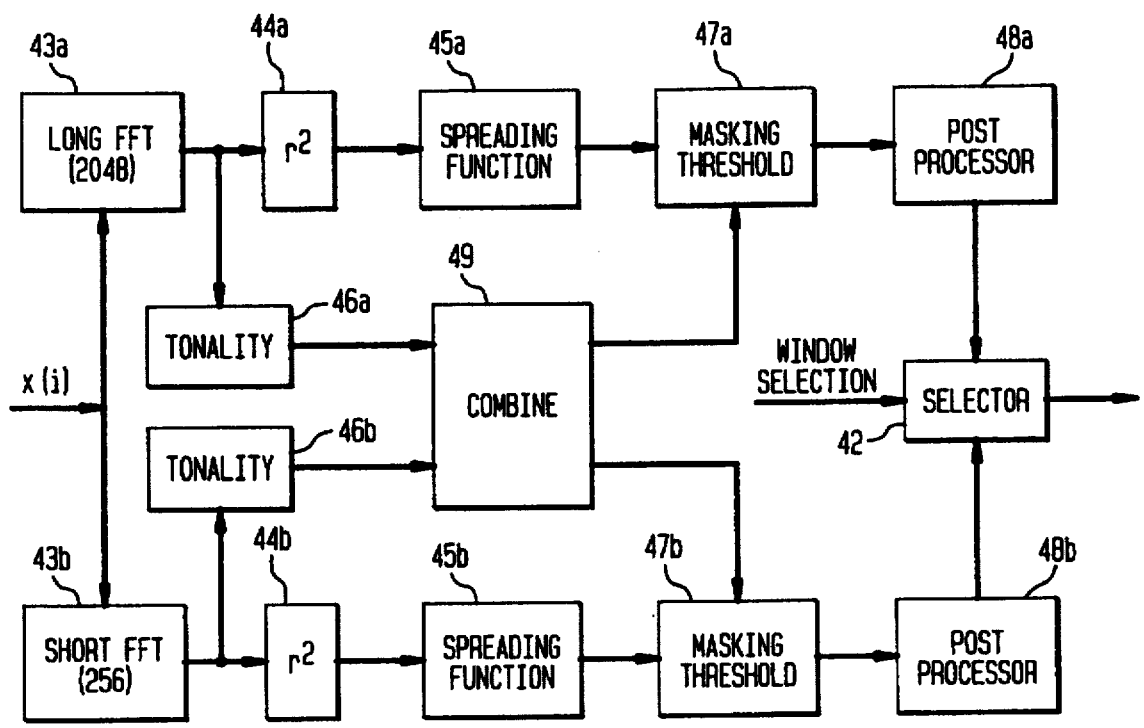
FIG. 18 presents an embodiment of the present invention employing coupled perceptual models.

For example, a further illustrative embodiment of the present invention is presented in FIG. 18. The embodiment is related to that presented in FIG. 16, but employs two perceptual models (indicated using indexes "a" and "b", respectively). The FFT 43, energy 44, spreading function processor 45, masking threshold processor 47, and post processor 48 are identical to those discussed above. In addition, there is a combining processor 49 which selects tonality values from the two models and a selector 42 which selects from among the two computed thresholds generated by processors 48. The difference between the two perceptual models 41 lies in the nature of the data being supplied to each model.

As is described in the above-referenced patent applications, it is advantageous at times to apply different length windowing functions (e.g., a long window of 2048 samples and a short window of 256 samples) to the audio signal prior to performing filter bank 1 operations. Switching from long windows to short windows is advantageous to the proper coding of fast attack sounds, such as that made by castanets; otherwise, long windows are advantageous. However, it is also advantageous to match the window length used in the tonality calculation with that of the filter bank 1, for the same reasons. With one exception, the embodiment presented in FIG. 18 performs a tonality computation based on both long and short windows and selects as between these results to facilitate use of the proper size window.

The exception is embodied in the combining processor 49. Processor 49 employs some short window tonality information in determining long window tonality, and visa-versa. In producing the long window tonality, information associated with the high frequency groups from the short window tonality is incorporated into the long window tonality. Thus the result is a combination of long and short window tonalities for each frequency group. Below a given frequency, long window tonality is used for each group; above that frequency, short window tonality is used for each group. Illustratively, this frequency is approximately 3 kHz. Short window tonality is obtained by averaging tonality values for each of eight short tonality values corresponding to a given long tonality value. Combining of tonality values is done to more accurately model the critical band processing of the ear. Similarly, in producing the short window tonality, information associated with the low frequency groups from the long window tonality is incorporated. Selection of coefficients to apply from a long to a short tonality, and visa versa, may be done on a nearest frequency basis.

The output of the combining processor 49 is provided to parallel masking threshold processors 47, just as in the embodiments of FIG. 16. The outputs of the post processors 48 are provided to a selector 42 which selects one of the two streams to pass on based on the length of the window selected.

With regard to both this and the above discussed embodiments, it may be advantageous to encode all bands below approximately 200 Hz as though they were tonal, regardless of the result of the tonality calculations. This has the effect of coding such bands as accurately as possible.

The present invention concerns a new method of determining tonelikeness for use in encoding. Decoders for use with encoders employing the present invention are described in one or more of the above-referenced patents and applications.

We claim:

1. A method of encoding an audio signal, the audio signal having a corresponding frequency domain representation, the frequency domain representation comprising one or more sets of frequency domain coefficients, one or more of said coefficients grouped into at least one frequency band, the method comprising the steps of:

generating at least one measure of the degree to which at least a first portion of the audio signal in a first time interval is tone-like, based on a measure of variability of an amplitude level of said first portion with respect to an amplitude level of a second portion of the audio signal in a second, different time interval, said first portion of said audio signal associated with the frequency band;

determining a noise masking threshold associated with the frequency band based on the at least one measure; and quantizing at least one set of the frequency domain coefficients corresponding to the frequency band based on the noise masking threshold to generate an encoded audio signal.

2. The method of claim 1, wherein for the first portion of the audio signal at least two measures of the degree to which said portion is tone-like are generated, each of said measures generated based on a different length analysis window, said method further comprising the step of selecting a measure of tonality for the first portion based on one of said at least two measures and a frequency corresponding to the first portion.

3. The method of claim 1, wherein the variability measure includes a comparison of a first energy content of the first audio signal portion with a second energy content of the second audio signal portion.

4. The method of claim 3, wherein the first energy content includes a first set of energy values of frequency components constituting the first audio signal portion, and the second energy content includes a second set of energy values of frequency components constituting the second audio signal portion, each energy value in the first set corresponding to a respective energy value in the second set, and wherein said comparison includes forming differences between the energy values in the first set and the corresponding energy values in the second set.

5. The method of claim 4, wherein the variability measure further includes a sum of said differences.

6. The method of claim 1, wherein the first and second audio signal portions are consecutive.

7. A system for encoding an audio signal, the audio signal having a corresponding frequency domain representation, the frequency domain representation comprising one or more sets of frequency domain coefficients, one or more of said coefficients grouped into at least one frequency band, the system comprising:

a generator for computing at least one measure of the degree to which at least a first portion of the audio signal in a first time interval is tonelike, based on a measure of variability of an amplitude level of said first portion with respect to an amplitude level of a second portion of the audio signal in a second, different time interval, said first portion of said audio signal associated with the frequency band;

a processor for determining a noise masking threshold associated with the frequency band based on the at least one measure; and a quantizer for guantizing at least one set of the frequency domain coefficients corresponding to the frequency band based on the noise masking threshold to generate an encoded audio signal.

8. The system of claim 7, wherein said generator computes at least two measures of the degree to which the first audio signal portion is tone-like, each of said measures based on a different length analysis window, said generator including means for selecting a measure of tonality for the first audio signal portion based on one of said at least two measures and a frequency corresponding to the first audio signal portion.

9. The system of claim 7, wherein the variability measure includes a comparison of a first energy content of the first audio signal portion with a second energy content of the second audio signal portion.

10. The system of claim 9, wherein the first energy content includes a first set of energy values of frequency components constituting the first audio signal portion, and the second energy content includes a second set of energy values of frequency components constituting the second audio signal portion, each energy value in the first set corresponding to a respective energy value in the second set.

11. The system of claim 10, wherein the variability measure is derived from a sum of differences between the energy values in the first set and the corresponding energy values in the second set.

12. The system of claim 7, wherein the first and second audio signal portions are consecutive.

13. Apparatus for encoding an audio signal, the audio signal having a corresponding frequency domain representation, the frequency domain representation comprising one or more sets of frequency domain coefficients, one or more of said coefficients grouped into at least one frequency band, the apparatus comprising:

a processor for computing at least one measure of the degree to which at least a first portion of the audio signal in a first time interval is tone-like, based on a measure of variability of an amplitude level of said first portion with respect to an amplitude level of a second portion of the audio signal in a second, different time interval, said first portion of said audio signal associated with the frequency band;

an analyzer for determining a noise masking threshold associated with the frequency band based on the at least one measure in accordance with a perceptual model; and a quantizer for guantizing at least one set of the frequency domain coefficients corresponding to the frequency band based on the noise masking threshold to generate an encoded audio signal.

14. The apparatus of claim 13, wherein at least two measures of the degree to which the first audio signal portion is tone-like are computed, each of said measures based on a different length analysis window, a measure of tonality for the first audio signal portion being selected based on one of said at least two measures and a frequency corresponding to the first audio signal portion.

15. The apparatus of claim 13, wherein the variability measure includes a comparison of a first energy content of the first audio signal portion with a second energy content of the second audio signal portion.

16. The apparatus of claim 15, wherein the first energy content includes a first set of energy values of frequency components constituting the first audio signal portion, and the second energy content includes a second set of energy values of frequency components constituting the second audio signal portion, each energy value in the first set corresponding to a respective energy value in the second set.

17. The apparatus of claim 16, wherein the variability measure is derived from a sum of differences between the energy values in the first set and the corresponding energy values in the second set.

18. The apparatus of claim 13, wherein the first and second audio signal portions are consecutive.

19. The apparatus of claim 13 wherein said processor includes said analyzer and said quantizer.

* * * * *